(12) United States Patent
Dhanabalan et al.

(10) Patent No.: US 11,683,166 B2
(45) Date of Patent: Jun. 20, 2023

(54) SECURE FILE MODIFICATION WITH SUPERVISION

(71) Applicant: Citrix Systems, Inc., Fort Lauderdale, FL (US)

(72) Inventors: Praveen Raja Dhanabalan, Bangalore (IN); Anudeep Athlur, Bangalore (IN); Anuj Magazine, Bangalore (IN)

(*) Notice: Subject to any disclaimer, the term of this patent is extended or adjusted under 35 U.S.C. 154(b) by 336 days.

(21) Appl. No.: 16/943,188

(22) Filed: Jul. 30, 2020

(65) Prior Publication Data
US 2021/0399886 A1  Dec. 23, 2021

(30) Foreign Application Priority Data
Jun. 17, 2020 (IN) .............................. 202041025496

(51) Int. Cl.
| H04L 9/08 | (2006.01) |
| G06F 16/176 | (2019.01) |
| G06F 21/60 | (2013.01) |
| G06F 16/11 | (2019.01) |

(52) U.S. Cl.
CPC .......... H04L 9/0861 (2013.01); G06F 16/116 (2019.01); G06F 16/176 (2019.01); G06F 21/602 (2013.01); H04L 9/0891 (2013.01)

(58) Field of Classification Search
CPC ..... H04L 9/0861; H04L 9/0891; H04L 9/085; H04L 9/3255; G06F 16/116; G06F 16/176; G06F 21/602; G06F 21/606; G06F 21/6209; G06F 21/6218; G06F 2221/2107
See application file for complete search history.

(56) References Cited

U.S. PATENT DOCUMENTS

| 8,655,844 B1* | 2/2014 | Wong .................... G06F 21/565 707/638 |
| 9,565,175 B1* | 2/2017 | Saylor .................... H04W 4/12 |
| 9,602,477 B1 | 3/2017 | Grzybowski et al. |
| 10,114,969 B1* | 10/2018 | Chaney .................... G06F 21/64 |
| 2010/0215172 A1* | 8/2010 | Schneider ............... H04L 9/085 713/171 |
| 2012/0303968 A1* | 11/2012 | Balinsky ................... H04L 9/14 713/189 |

(Continued)

OTHER PUBLICATIONS

P.V. Siva Kumar, "Multi-Level Secret Sharing Scheme for Mobile Ad-Hoc Networks", Int. J. Advanced Networking and Applications, vol. 6 Issue: 2 pp. 2253-2261 (2014), 9 pages (Year: 2014).*

(Continued)

*Primary Examiner* — Han Yang

(57) ABSTRACT

In some embodiments, a method may be performed by a computing device that involves displaying an identifier indicative of a file, the display of the identifier being readable by a second device, receiving first data from the second device in response to the identifier being read by the second device, and enabling performance of at least one action with respect to the file with use of the first data. In some embodiments, the method may further involve receiving a first encryption fragment associated with the file, receiving, from the second device, a second encryption fragment associated with the file, reconstructing, using at least the first encryption fragment and the second encryption fragment, an encryption key enabling viewing of the file, and viewing the file using the encryption key.

18 Claims, 22 Drawing Sheets

(56) References Cited

U.S. PATENT DOCUMENTS

2018/0062852 A1    3/2018  Schmahmann
2021/0406225 A1*  12/2021  Akhoury ............... H04L 9/3247

OTHER PUBLICATIONS

Hossein Ghodosi, "Secret Sharing in Multilevel and Compartmented Groups", Proc. ACISP 1998, LNCS, vol. 1438,367-378, Springer Verlag, 1998, 12 pages (Year: 1998).*
International Search Report and Written Opinion dated Sep. 16, 2021 for International Patent Application No. PCT/US2021/035834.
"Secret sharing", Wikipedia, Retrieved Jul. 30, 2020. https://en.wikipedia.org/wiki/Secret_sharing.
"Shamir's secret sharing", Wikipedia, Retrieved Jul. 30, 2020. https://en.wikipedia.org/wiki/Shamir%27s_Secret_Sharing.
"Secret sharing using the Chinese remainder theorem", Wikipedia, Retrieved Jul. 30, 2020. https://en.wikipedia.org/wiki/Secret_sharing_using_the_Chinese_remainder_theorem.
"Blakley's scheme", Wikipedia, Retrieved Jul. 30, 2020. https://en.wikipedia.org/wiki/Secret_sharing#Blakley's_scheme.

* cited by examiner

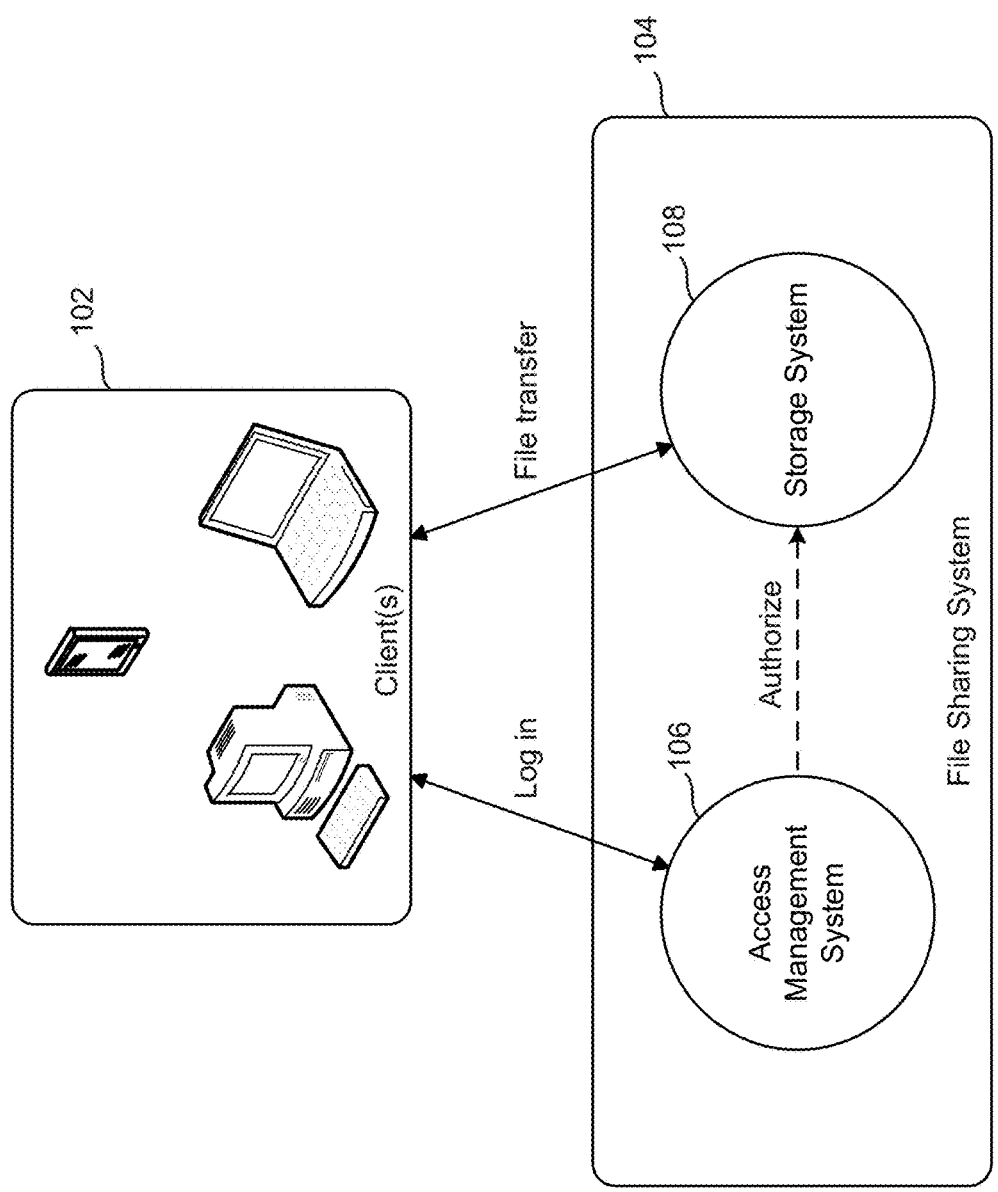

SECURE FILE MODIFICATION WITH SUPERVISION

CROSS-REFERENCE TO RELATED APPLICATIONS

This application claims priority under 35 U.S.C. § 119(a) to Provisional Application No. 202041025496, entitled SECURE FILE MODIFICATION WITH SUPERVISION, which was filed with the Indian Patent Office on Jun. 17, 2020, the entire contents of which are incorporated herein by reference for all purposes.

BACKGROUND

Various file sharing systems have been developed that allow users to share files or other data and/or view or modify files. ShareFile®, offered by Citrix Systems, Inc., of Fort Lauderdale, Fla., is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method performed by a computing device involves displaying an identifier indicative of a file, the display of the identifier being readable by a second device, receiving first data from the second device in response to the identifier being read by the second device, and enabling performance of at least one action with respect to the file with use of the first data.

In some disclosed embodiments, a computing system includes at least one processor and at least one computer-readable medium that is encoded with instructions which, when executed by the at least one processor, cause the computing system to display, by a computing device, an identifier indicative of a file, the display of the identifier being readable by a second device, to receive, by the computing device, first data from the second device in response to the identifier being read by the second device, and to enable, by the computing device, performance of at least one action with respect to the file with use of the first data.

In some disclosed embodiments, a method performed by computing system involves generating first fragments of data for a plurality of client devices based on a key of a file, the first fragments of data assigned to different client devices and including a first fragment of data assigned to a first client device, generating an identifier, the identifier configured to initiate a transfer of a second fragment of data from a second client device to the first client device in response to the identifier being displayed on the first client device and read by the second client device, and sending the file, the identifier, and the first fragment of data to the first client device to enable the first client device to take at least one action with respect to the file in response to receipt of the second fragment of data from the second client device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 5B is a diagram illustrating certain operations that may be performed by the file sharing system shown in FIG. 5A in accordance with some embodiments;

DETAILED DESCRIPTION

Figure 1A:
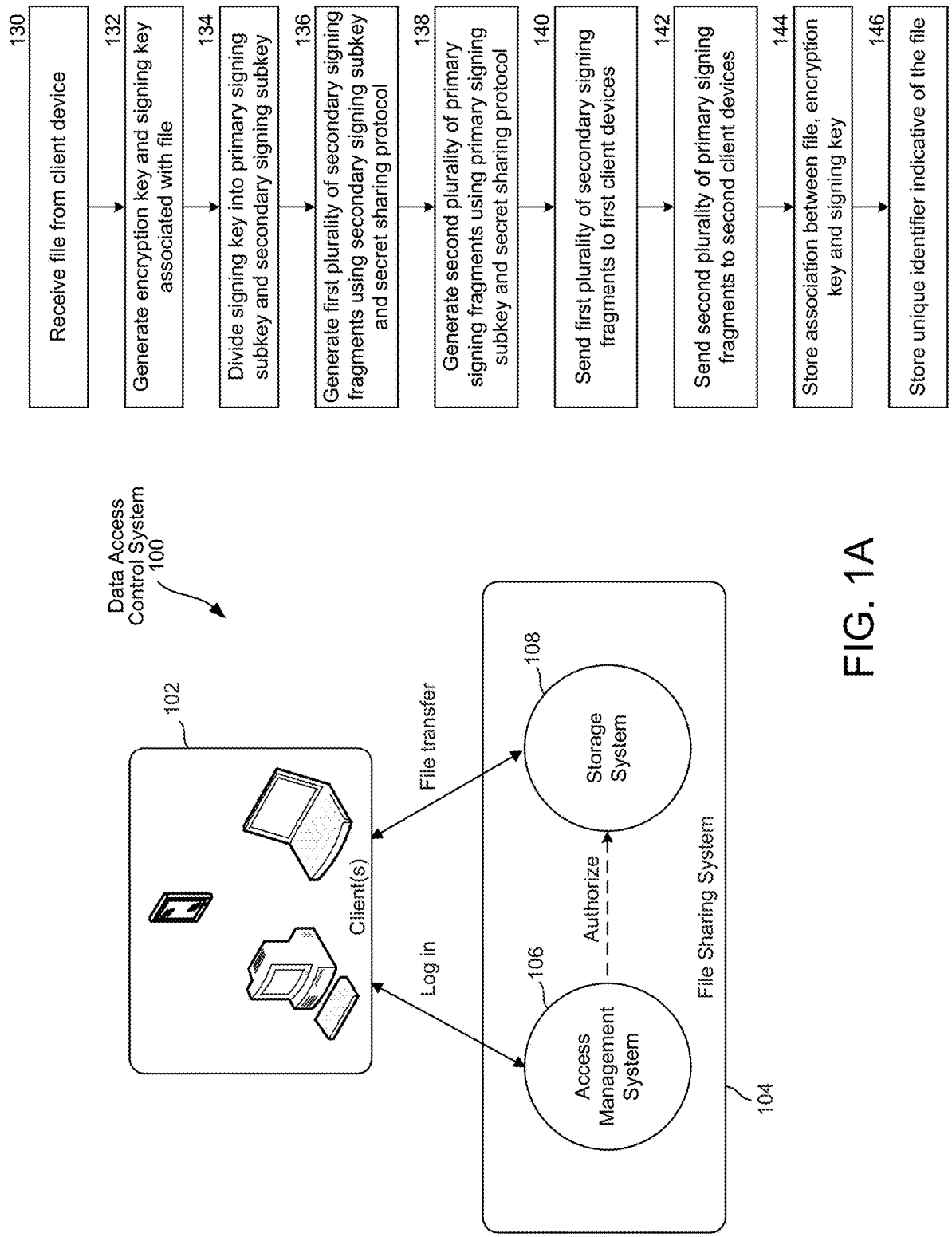
FIG. 1A is a diagram illustrating certain features of an embodiment of a data access control system configured in accordance with the present disclosure.

The inventors have recognized and appreciated that it may be desirable in some file sharing systems to require one or more users to be present in order to view and/or edit a file. In particular, the inventors have recognized and appreciated that it may be desirable to configure a file sharing system so that viewing a file and/or to taking action on the file, like making an update to the file or signing a document, may be performed only by a minimum number of primary users under supervision or in the physical presence of a minimum number of secondary users. Further, the inventors have recognized and appreciated that such a file sharing system could be compromised if an electronic signature is forged or cannot be validated, the supervisor(s) cannot be validated, and/or the file sharing system does not require and/or validate that the supervisor(s) is present during the modification.

Offered is a system in which a first minimum number n of primary users and a second minimum number m of secondary users are required in order to view and/or modify the file. For example, the system may associate or otherwise assign a file with an encryption key (e.g., a key to enable the file to be viewed) and a signing key (e.g., a key to enable the file to be modified). Using a secret sharing protocol, the system can divide the encryption key and/or the signing key into a plurality of encryption fragments and/or a plurality of signing fragments. While the system may generate an encryption fragment and/or signing fragment for multiple primary user(s) and/or secondary user(s), in some implementations, reconstruction of the original encryption key and/or the original signing key can be done using the first minimum number n of primary fragments and the second minimum number m of secondary fragments. For example, in some implementations, the reconstruction of the original signing key can be done using n primary signing fragments and m secondary signing fragments, but cannot be accomplished with n−1 primary signing fragments or m−1 secondary signing fragments. Thus, the file sharing system may require a certain combination of primary users and secondary users be present in order to view and/or modify the file.

Although the following description generally refers to a "file" that can be accessed, it should be appreciated that this disclosure is not limited to the accessing of files, as the disclosed systems and techniques can likewise be used to control access to data that is not in the form of a file. For example, as described in more detail below, in some embodiments the data access control techniques disclosed herein may also be used to regulate access to a computing environment delivered to a user's computer by a server-based application delivery system, to regulate access to one or more applications or other resources delivered to such a computing environment, and/or to regulate access to one or more applications or other resources on a user's computing device. The general use of term "file" in this disclosure should thus not be considered limiting.

Additionally or alternatively, it should be appreciated that this disclosure is not limited to the accessing of an entire file, as the disclosed systems and techniques can likewise be used to control access to a portion of a file or data. For example, a file may be represented using first data and access to a first portion of the first data may be unrestricted while access to a second portion of the first data may be restricted. In some examples, the system may use multiple signing keys to control access to different portions of the file/data without departing from the disclosure. For example, the system may control access to the first portion of the first data using a first signing key, while controlling access to the second portion of the first data using a second signing key, although the disclosure is not limited thereto.

For purposes of reading the description of the various embodiments below, the following descriptions of the sections of the specification and their respective contents may be helpful:

Section A provides an introduction to example embodiments of a data access control system;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes example embodiments of systems for providing file sharing over networks;

Section F provides a more detailed description of example embodiments of a data access control system that was introduced above in Section A; and Section G describes example implementations of methods, systems/devices, and computer-readable media in accordance with the present disclosure.

A. Introduction to Illustrative Embodiments of a Data Access Control System

FIG. 1A is a diagram illustrating certain features of an embodiment of a data access control system configured in accordance with the present disclosure. As illustrated in FIG. 1A, a data access control system 100 may include one or more clients 102 (also generally referred to as local machine(s) 102 or client device(s) 102) and a file sharing system 104, which may include an access management system 106 and a storage system 108. For example, a client 102 may log in to the access management system 106, which may authorize the client 102 to enable the client 102 to perform a file transfer to send (e.g., upload) a file to the storage system 108 and/or receive (e.g., download) a file from the storage system 108. A detailed description of an example implementation of the file sharing system 104 is provided below (in Section E) in connection with FIGS. 5A-C.

The data access control system 100 may be used to control the circumstances under which a client 102 may view and/or modify a file. For example, when the client 102 sends a new file to the storage system 108, the access management system 106 may generate an encryption key and a signing key and associate or otherwise assign the encryption key and the signing key to the file. Once an encryption key is associated with or otherwise assigned to a file, the data access control system 100 may require the encryption key in order to view the file. Thus, the data access control system 100 may control whether a client 102 may view the file unsupervised or whether multiple clients 102 are required in order to enable viewing of the file. For example, the client 102 may download the file along with the encryption key and may view the file using the encryption key.

Similarly, once a signing key is associated with or assigned to the file, the data access control system 100 may require the signing key in order to modify the file. Thus, the data access control system 100 may control whether a client 102 may modify the file unsupervised or whether multiple clients 102 (e.g., and how many clients 102) are required in order to enable modifying of the file. For example, the client 102 may download the file along with the encryption key and the signing key and may access and modify the file using the encryption key and the signing key, respectively. As used herein, modifying a file refers to making any changes to the file and/or data of the file, such as signing the file (e.g., attaching a digital signature), editing contents of the file (e.g., modifying text, images, or other content represented in the file), and/or the like. In some examples, the system 100 may enable the client 102 to both view and modify the file using the signing key. For example, the system 100 may require the encryption key to view the file, whereas the system 100 may enable the client 102 to view and modify the file using the signing key without departing from the disclosure.

As used herein, a file may refer to data representing a file, document, content, and/or the like, although the disclosure is not limited thereto. As used herein, the disclosure may refer to a person that creates a file as an "owner," a person that performs an action on the file as a "primary user," and a person that supervises or approves of the action taken by the primary user as a "secondary user" (e.g., supervisor, approver, etc., although the disclosure is not limited thereto). In some examples, the owner may also be a primary user or a secondary user without departing from the disclosure.

The data access control system 100 (which may be referred to as system 100) may include the client(s) 102, the file sharing system 104, the access management system 106, the storage system 108, and/or other components. Additionally or alternatively, in some implementations the data access control system 100 may be included within, or operate in conjunction with, the file sharing system 104. For ease of illustration, the disclosure may refer to the system 100 to indicate actions performed by any of these device(s) and/or system(s). For example, the disclosure may refer to the system 100 performing a first action using a first client 102(1), performing a second action using a second client 102(2), and/or performing a third action using the file sharing system 104 without departing from the disclosure.

In some examples, the data access control system 100 may enable a first client 102(1) to view a file without interacting with other clients 102. For example, the first client 102(1) may store an encryption key that enables the first client 102(1) to view the file (e.g., enables read access), although the disclosure is not limited thereto.

Figure 1B:
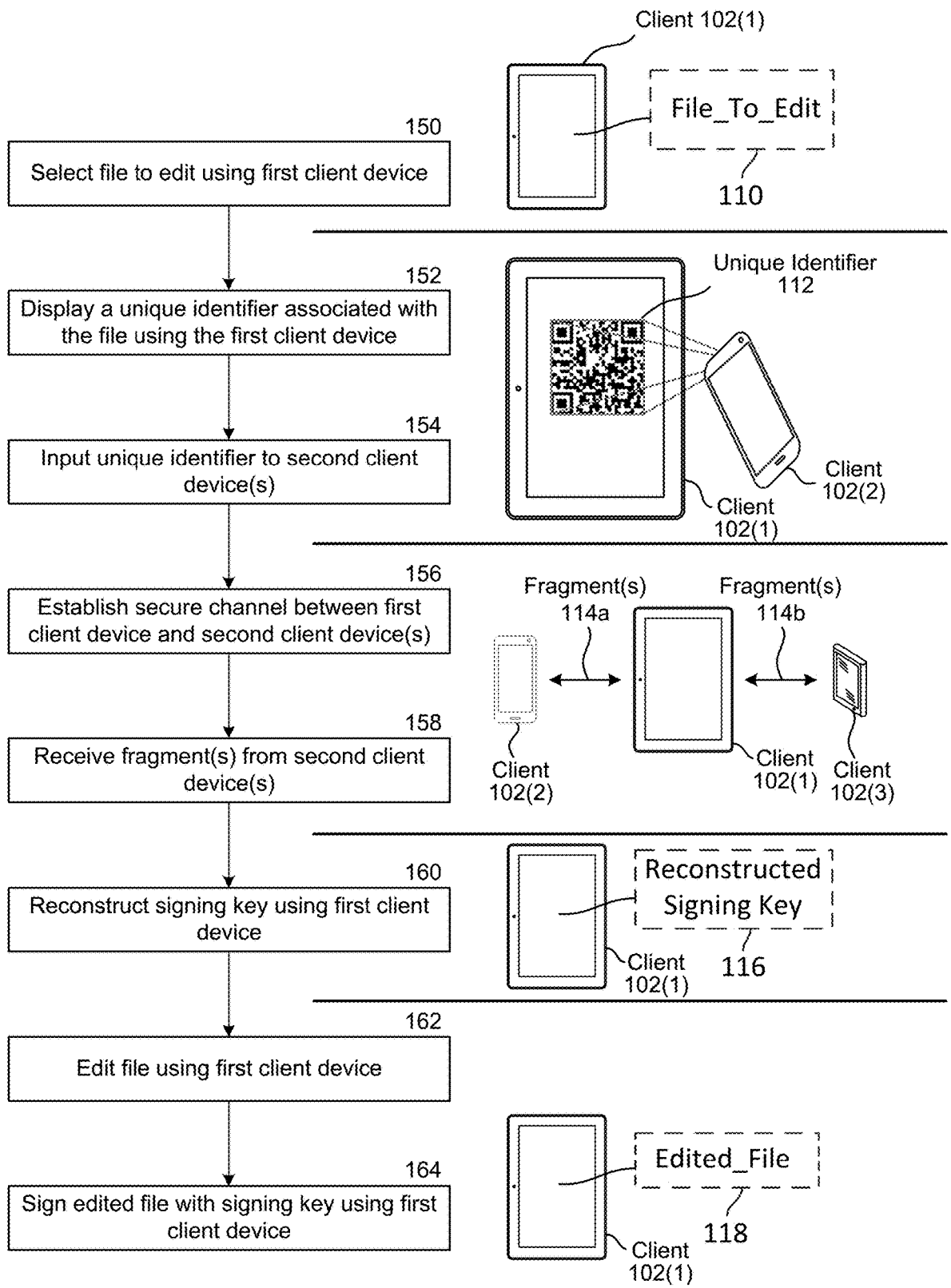
FIG. 1B is a diagram illustrating certain features of an embodiment of a data access control system configured in accordance with the present disclosure.

While in some examples the first client 102(1) may store the encryption key and view the file on its own, the data access control system 100 may prevent the first client 102(1) from modifying the file without additional user(s) present. For example, the data access control system 100 may divide the signing key into a plurality of individual signing keys and may require that a minimum number of individual signing keys be present to modify the file. Thus, the data access control system 100 may require that the first client 102(1) receive individual signing keys from additional clients 102 in order to modify the file. For example, FIG. 1B illustrates an example in which the first client 102(1) receives first fragment(s) 114a (e.g., signing fragment and/or encryption fragment) from a second client 102(2) and second fragment(s) 114b (e.g., signing fragment and/or encryption fragment) from a third client 102(3). However, the disclosure is not limited thereto and the number of signing fragments may vary without departing from the disclosure.

Additionally or alternatively, the data access control system 100 may distinguish between primary signing fragments and secondary signing fragments. For example, the data access control system 100 may require a first minimum number of primary signing fragments and a second minimum number of secondary signing fragments prior to enabling the first client 102(1) to modify the file.

An individual client 102 may be associated with or otherwise assigned to a primary user/secondary user, such that the client 102 stores a primary/secondary signing fragment corresponding to the primary user/secondary user. For example, the first client 102(1) may be associated with or assigned to a first primary user, the second client 102(2) may be associated with or assigned to a second primary user, and the third client 102(3) may be associated with or assigned to a first secondary user, although the disclosure is not limited thereto. In this example, the first client 102(1) may store a first primary signing fragment of the first user, the second client 102(2) may store a second primary signing fragment of the second user, and the third client 102(3) may store a first secondary signing fragment of the first supervisor. In some examples, however, the second client 102(2) may be associated with or otherwise assigned to a second secondary user and may store a second secondary signing fragment of the second secondary user without departing from the disclosure.

As part of creating the file or uploading the file to the file sharing system 104, the owner may indicate the first minimum number of primary signing fragments and the second minimum number of secondary signing fragments required to modify the file. For example, the owner of a first file may require a single primary user (e.g., one primary signing fragment) and multiple secondary users (e.g., two or more secondary signing fragments) to edit the first file, the owner of a second file may require multiple primary users (e.g., two or more primary signing fragments) and a single secondary user (e.g., one secondary signing fragment) to edit the second file, while the owner of a third file may require multiple primary users and multiple secondary users to edit the third file. The disclosure is not limited thereto and the first minimum number of primary signing fragments and the second minimum number of secondary signing fragments may vary without departing from the disclosure.

In some examples, the first minimum number of primary signing fragments may be a subset of a total number of primary signing fragments. Thus, only a portion of the total number of primary signing fragments are required to modify the file, such that the first minimum number of primary signing fragments n is less than a total number of primary signing fragments N (e.g., n<N). For example, a first file may be associated with or otherwise assigned to three or more users and the data access control system 100 may require that only one or two primary users be present and provide primary signing fragments in order to modify the first file. However, the disclosure is not limited thereto and in other examples the total number of primary signing fragments are required to modify the file, such that the first minimum number of primary signing fragments n may be equal to the total number of primary signing fragments N (e.g., n=N). For example, a second file may be associated with or assigned to two users and the data access control system 100 may require that both users be present and provide primary signing fragments in order to modify the second file.

Similarly, in some examples the second minimum number of secondary signing fragments may be a subset of a total number of secondary signing fragments. Thus, only a portion of the total number of secondary signing fragments may be required to modify the file, such that the second minimum number of secondary signing fragments m is less than a total number of secondary signing fragments M (e.g., m<M). For example, a third file may be associated with or otherwise assigned to three or more secondary users and the data access control system 100 may require that only one or two secondary users be present and provide secondary signing fragments in order to modify the third file. However, the disclosure is not limited thereto and in other examples the total number of secondary signing fragments may be required to modify the file, such that the second minimum number of secondary signing fragments m may be equal to the total number of secondary signing fragments M (e.g., m=M). For example, a fourth file may be associated with or assigned to two secondary users and the data access control system 100 may require that both secondary users be present and provide secondary signing fragments in order to modify the fourth file.

FIG. 1A illustrates an example of the file sharing system 104 receiving a new file and generating signing keys for the new file. For example, when a client 102 sends a new file to the storage system 108, the access management system 106 may generate an encryption key and a signing key and associate or otherwise assign the encryption key and the signing key to the file.

As illustrated in FIG. 1A, the file sharing system 104 may receive (130) a file from a client device (e.g., first client 102(1)) and may generate (132) an encryption key and a signing key for the file. As described above, the encryption key may enable a client 102 to view the file, whereas the signing key may enable the client 102 to modify the file. The file sharing system 104 may then divide (134) the signing key into multiple subkeys (e.g., a primary signing subkey and secondary signing subkey).

The file sharing system 104 may generate (136) a first plurality of secondary signing fragments using the secondary signing subkey and a secret sharing protocol, as described in greater detail below with regard to FIGS. 6A-6B. For example, the file sharing system 104 may determine the second minimum number of secondary signing fragments and the total number of secondary signing fragments and generate the first plurality of secondary signing fragments accordingly. Thus, the data access control system 100 may require at least the second minimum number of secondary signing fragments in order to reconstruct the secondary signing subkey so that it can be used to modify the file.

Similarly, the file sharing system 104 may generate (138) a second plurality of primary signing fragments using the primary signing subkey and a secret sharing protocol, as described in greater detail below with regard to FIGS. 6A-6B. For example, the file sharing system 104 may determine the first minimum number of primary signing fragments and the total number of primary signing fragments and generate the second plurality of primary signing fragments accordingly. Thus, the data access control system 100 may require at least the first minimum number of primary signing fragments in order to reconstruct the primary signing subkey so that it can be used to modify the file.

While not illustrated in FIG. 1A, the file sharing system 104 may receive input from the client 102 indicating the first minimum number of primary signing fragments, the total number of primary signing fragments, the second minimum number of secondary signing fragments, the total number of secondary signing fragments, and/or the like without departing from the disclosure. Additionally or alternatively, the disclosure is not limited thereto and the first client 102(1) may generate the signing keys without departing from the disclosure.

The file sharing system 104 may send (140) the first plurality of secondary signing fragments to first client devices of secondary users. For example, if the file sharing system 104 generated M secondary signing fragments, the file sharing system 104 may send the M secondary signing fragments to M first clients 102. However, the disclosure is not limited thereto, and in some examples the file sharing system 104 may store the M secondary signing fragments in the storage system 108 or store a first subset of the M secondary signing fragments while sending a second subset of the M secondary signing fragments to some secondary users without departing from the disclosure.

Similarly, the file sharing system 104 may send (142) the second plurality of primary signing fragments to second client devices associated with primary users. For example, if the file sharing system 104 generated N primary signing fragments, the file sharing system 104 may send the N primary signing fragments to N second clients 102. However, the disclosure is not limited thereto, and in some examples the file sharing system 104 may store the N primary signing fragments in the storage system 108 or store a first subset of N individual primary signing fragments while sending a second subset of the N individual primary signing fragments to some primary users without departing from the disclosure.

Finally, the file sharing system 104 may store (144) an association (e.g., an assignment, mapping, or other identification) between the file, the encryption key, and the signing key in the storage system 108 and may store (146) a unique identifier indicative of the file in the storage system 108. The unique identifier may indicate an identity of the file 110 and/or additional information that enables a client 102 to receive individual signing fragments from other clients 102 and/or the file sharing system 104 in order to reconstruct the signing key and modify the file. For example, the unique identifier may be associated with (e.g., assigned to or mapped with) a specific file and the data access control system 100 may enable a first client 102(1) to display the unique identifier so that a second client 102(2) may capture the unique identifier and send a corresponding individual signing key to the first client 102(1).

While FIG. 1A illustrates the file sharing system 104 storing the unique identifier and a file as part of creating and storing the file, the disclosure is not limited thereto. In some examples, the file sharing system 104 may generate the unique identifier (or generate a second unique identifier) when a client 102 requests the file from the storage system 108. For example, when a first client 102(1) requests a first file from the storage system 108, the file sharing system 104 may generate a first unique identifier for the first file and the first client 102(1). Thus, when a second client 102(2) captures the first unique identifier displayed by the first client 102(1), the second client 102(2) may use the first unique identifier to identify a signing fragment of the first file and to identify the first client 102(1) to which to send the signing fragment.

Figure 2:
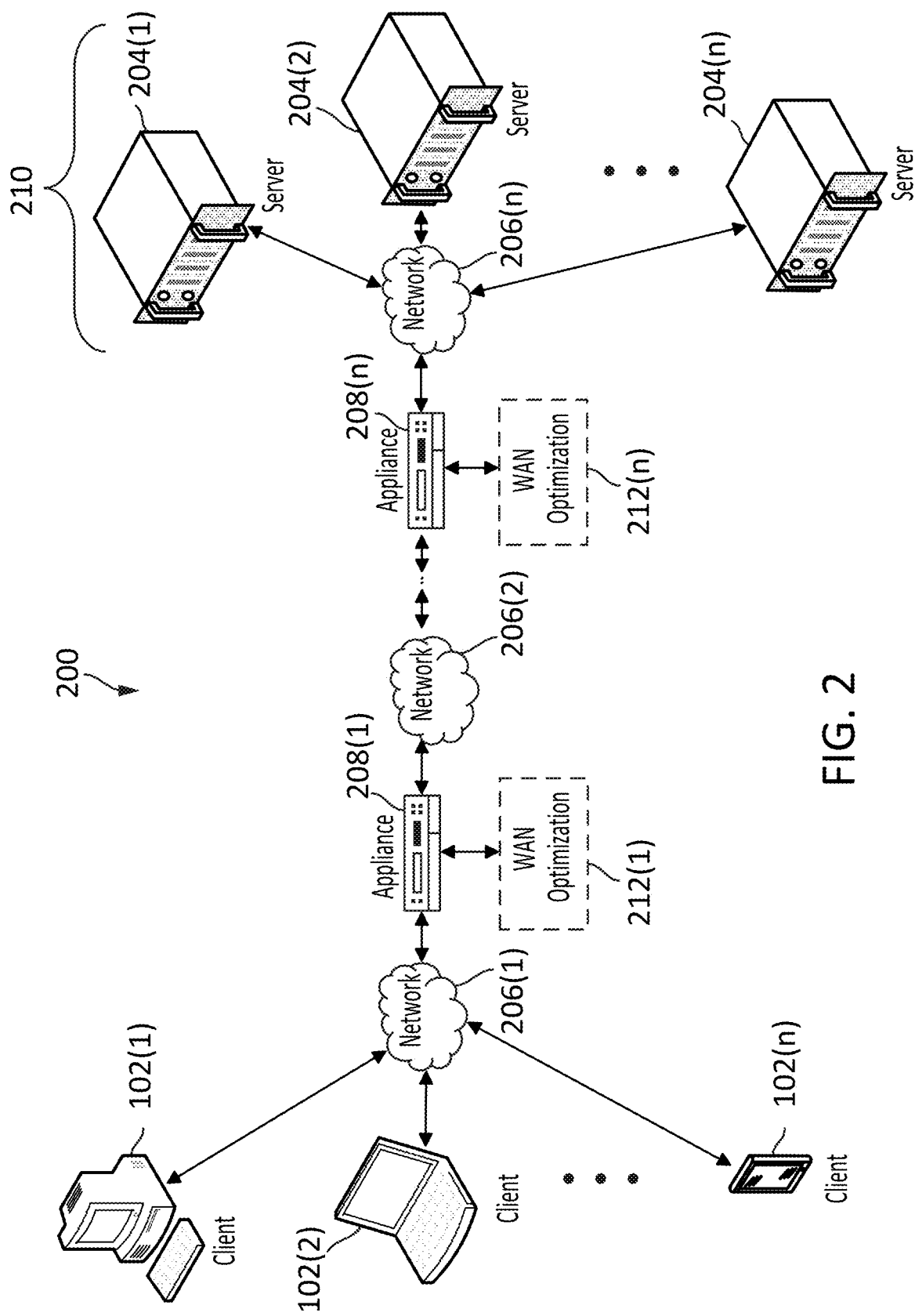
FIG. 2 is a diagram of a network environment in which some embodiments of the data access control system disclosed herein may deployed.

FIG. 1B is a diagram illustrating certain features of an embodiment of a data access control system configured in accordance with the present disclosure. As illustrated in FIG. 1B, a first client 102(1) may receive signing fragments from a second client 102(2) and a third client 102(3) and use the signing fragments to reconstruct a signing key of a file in order to modify the file. Although FIG. 1B illustrates an example including only three clients 102 (e.g., first client 102(1), second client 102(2), and third client 102(3)), it should be appreciated that the data access control system 100 may include any number of clients 102 as well as any number of additional or different components, such as the file sharing system 104, one or more servers, one or more databases, other network components, and/or the like without departing from the disclosure. For example, FIG. 2 illustrates an example in which the data access control system 100 may include multiple clients 102 (e.g., clients 102(1)-102(n)) that may communicate with each other and/or one or more servers 204 (e.g., servers 204(1)-204(n)) via one or more networks 206, as described in greater detail below. In some examples, the one or more servers 204 may be associated with the file sharing system 104, although the disclosure is not limited thereto.

While FIG. 2 illustrates an example of the clients 102 (e.g., clients 102(1)-102(n)) communicating with each other and/or one or more servers 204 via network(s) 206, the disclosure is not limited thereto and in some examples the clients 102 may communicate with one another directly without using a network 206. For example, the first client 102(1) may establish a secure connection with the second client 102(2) using a wireless protocol such as Bluetooth, Near Field Communication (NFC), and/or the like, although the disclosure is not limited thereto and the clients 102 may establish wired and/or wireless connections without departing from the disclosure.

In some examples, the data access control system 100 may establish secure connections among the first client 102(1), the second client 102(2) and the third client 102(3) using communication protocols that require physical proximity, such as short range networks. This ensures that the first user of the first client 102(1) is in proximity to the second user of the second client 102(2) and the first supervisor of the third client 102(3) when modifying the file. As an additional safeguard, the data access control system 100 may ensure that the file is not pre-edited (e.g., modified prior to receiving the primary signing fragment(s) and the secondary signing fragment(s)) by validating a signature of the file with the signing key before editing. Additionally or alternatively, the data access control system 100 may sign the file with the signing key after editing the file (e.g., re-sign the file a second time). For example, the data access control system 100 may generate a signature associated with the file that may be used to verify that the contents of the file are accurate and not changed after the edits were made. In some examples, the signature may indicate information about the file that may be used to verify that the file is unchanged, such as an exact size of the file, a summary or footprint indicating contents of the file, and/or the like without departing from the disclosure.

As described in greater detail below, the first client 102(1) may receive primary/secondary signing fragments of a first file, determine a signing key (e.g., reconstruct the signing key) of the first file using the primary/secondary signing fragments and a secret sharing protocol, modify the first file using the signing key, and sign the modified first file using the signing key.

In some examples, the first client 102(1) may receive the primary/secondary signing fragments from the second client 102(2) and the third client 102(3) while connected (e.g., communicatively coupled) to the one or more servers 204 via the network(s) 206 (e.g., in an online state). After modifying and signing the first file, the first client 102(1) may send the first file along with a signature of the first file to the one or more servers 204. The one or more servers 204 may retrieve the signing key of the first file from a database and may use the signing key to validate the first file and/or the signature. For example, the one or more servers 204 may compare a first signing key retrieved from the database with a second signing key associated with the first file, although the disclosure is not limited thereto. Additionally or alternatively, the one or more servers 204 may use the first signing key retrieved from the database in order to unlock and/or modify the first file, such that successfully unlocking and/or modifying the first file validates the first file. After validating the first file, the one or more servers 204 may store the modified version of the first file and/or replace an existing version of the first file with the modified version of the first file.

In other examples, however, the first client 102(1) may receive the primary/secondary signing fragments from the second client 102(2) and the third client 102(3) without being connected (e.g., communicatively coupled) to the one or more servers 204 via the network(s) 206 (e.g., in an offline state). When this occurs, the first client 102(1) may modify the first file, as described above, and may store the first file locally on the first client 102(1). Later, when the first client 102(1) is connected to the one or more servers 204 again, the first client 102(1) may send the first file and/or the signature to the one or more servers 204 and the one or more servers 204 may validate the first file and store the modified first file. Thus, the data access control system 100 may enable the first client 102(1) to modify the first file while offline and yet still enabling the one or more servers 204 to validate and store the first file to maintain a history and/or current version of the first file.

As illustrated in FIG. 1B, the data access control system 100 may select (150) a file to edit using a first client device. For example, FIG. 1B illustrates the first client 102(1) selecting a file 110 (e.g., "File_To_Edit"). The system 100 may display (152) a unique identifier of the file using the first client device and may allow the unique identifier to be input (154) into or otherwise received by second client device(s). For instance, FIG. 1B illustrates an example in which the first client 102(1) displays a unique identifier 112 and a second client 102(2) captures an image (e.g., generates image data) representing the unique identifier 112. The unique identifier 112 may indicate an identity of the file 110 and/or additional information, such as information about the first client 102(1). For example, the second client 102(2) may scan the unique identifier 112 to identify the file 110, identify network and/or device information for the first client 102(1), and/or the like to enable the second client 102(2) to send a second primary signing fragment to the first client 102(1).

While FIG. 1B illustrates an example of the unique identifier 112 being a barcode (e.g., Quick Response (QR) code), the disclosure is not limited thereto and the unique identifier 112 may vary without departing from the disclosure. In some examples, the unique identifier 112 may be a string of alphanumeric characters, a file name of the file 110, a device name and/or network information of the first client 102(1), and/or the like without departing from the disclosure.

While not illustrated in FIG. 1B, in some examples the second client device(s) may interact with the file sharing system 104 in response to the second client device(s) inputting the unique identifier. For example, the second client device(s) may send the unique identifier to the file sharing system 104 and may receive individual signing keys and/or a command to send the individual signing keys to the first client 102(1) without departing from the disclosure.

As illustrated in FIG. 1B, the system 100 may establish (156) a secure channel between the first client device and second client device(s) and may receive (158) key(s) from the second client device(s). For example, FIG. 1B illustrates an example in which the first client 102(1) receives first fragment(s) 114a from the second client 102(2) and second fragment(s) 114b from the third client 102(3). In some examples, the second client 102(2) may be associated with a second primary user and the first fragment(s) 114a may correspond to a second primary signing fragment, while the third client 102(3) may be associated with a first secondary user and the second fragment(s) 114b may correspond to a first secondary signing fragment. However, the disclosure is not limited thereto, and in other examples the second client 102(2) may be associated with a second secondary user and the first fragment(s) 114a may correspond to a second secondary signing fragment without departing from the disclosure.

While not illustrated in FIG. 1B, the first client 102(1) may establish a secure connection with additional client(s) 102 and may receive additional fragment(s) 114 from the additional client(s) 102. For example, a fourth client 102(4) (not illustrated) may be associated with the second secondary user and the first client 102(1) may receive third fragment(s) 114c from the fourth client 102(4) without departing from the disclosure.

In some examples, the data access control system 100 may grant read access to the file 110 to individual clients 102. Thus, the first client 102(1) may view the file 110 using an encryption key stored on the first client 102(1). When read access to the file 110 is granted, the fragments 114 do not include primary/secondary encryption fragments and instead correspond to primary/secondary signing fragments, such that the first fragment 114a corresponds to the second primary signing fragment (or the second secondary signing fragment) and the second fragment 114b corresponds to the first secondary signing fragment. However, the disclosure is not limited thereto, and in other examples the data access control system 100 may restrict read access to the file 110, such that the first client 102(1) cannot view the file 110 without permission from the second client 102(2) and the third client 102(3).

When read access to the file 110 is restricted, the first client 102(1) may store only a portion of the encryption key, such as a first primary encryption fragment. Thus, to view and edit the file 110, the first client 102(1) may receive a second primary encryption fragment (or second secondary encryption fragment) from the second client 102(2) and receive a first secondary encryption fragment from the third client 102(3). When read access to the file 110 is restricted, the fragments 114 correspond to both primary/secondary signing fragments and primary/secondary encryption fragments. For example, the first client 102(1) may receive the first fragment(s) 114a from the second client 102(2), such as the second primary signing fragment and the second primary encryption fragment (or the second secondary signing fragment and the second secondary encryption fragment), and may receive the second fragment(s) 114b from the third client 102(3), such as the first secondary signing fragment and the first secondary encryption fragment.

As described in greater detail below with regard to FIGS. 6A-6B, the system 100 may generate signing fragments of the file 110 using the signing key and data sharing techniques, such as a secret sharing protocol. For example, the system 100 may divide the signing key into a primary signing subkey and a secondary signing subkey. Using the secret sharing protocol, the system 100 may generate a first number (N) of primary signing fragments corresponding to the primary signing subkey and may generate a second number (M) of secondary signing fragments corresponding to the secondary signing subkey.

The system 100 may generate the first number of primary signing fragments such that the primary signing subkey can be reconstructed using a first minimum number (n) of received primary signing fragments. For example, the system 100 may use the secret sharing protocol to reconstruct the primary signing subkey using any two received primary signing fragments, although the disclosure is not limited thereto. Similarly, the system 100 may generate the second number of secondary signing fragments such that the secondary signing subkey can be reconstructed using a second minimum number (m) of received secondary signing fragments. For example, the system 100 may use the secret sharing protocol to reconstruct the secondary signing subkey using any two received secondary signing fragments, although the disclosure is not limited thereto.

As illustrated in FIG. 1B, the system 100 may reconstruct (160) the signing key using the first client device. For example, the first client 102(1) may use the secret sharing protocol, the first primary signing fragment stored on the first client 102(1), the second primary signing fragment received from the second client 102(2), and the first secondary signing fragment received from the third client 102(3) to reconstruct the signing key of the file 110 by generating reconstructed signing key 116.

The system 100 may edit (162) the file using the first client device and may sign (164) the edited file with the signing key using the first client device. For example, the client 102(1) may edit the file 110 to generate an edited file 118 (e.g., "Edited_File") and sign the edited file 118 using the reconstructed signing key 116. In some examples, signing the edited file 118 using the reconstructed signing key 116 corresponds to generating a signature using the reconstructed signing key 116. For example, the first client 102(1) may generate a signature that can be used to validate contents of the edited file 118, although the disclosure is not limited thereto. While FIG. 1B illustrates the system editing the file and editing the file as two separate steps, the disclosure is not limited thereto and the first client 102(1) may edit the file and sign the edited file in a single step without departing from the disclosure.

As described above, the client 102(1) may later send the edited file 118 and/or a signature of the edited file 118 to the one or more servers 204, although the disclosure is not limited thereto.

Additional details and example implementations of embodiments of the present disclosure are set forth below in Section G, following a description of example systems and network environments in which such embodiments may be deployed.

B. Network Environment

Referring to FIG. 2, an illustrative network environment 200 is depicted. As shown, the network environment 200 may include one or more clients 102(1)-102(n) (also generally referred to as local machine(s) 102 or client(s) 102) in communication with one or more servers 204(1)-204(n) (also generally referred to as remote machine(s) 204 or server(s) 204) via one or more networks 206(1)-206(n) (generally referred to as network(s) 206). In some embodiments, a client 102 may communicate with a server 204 via one or more appliances 208(1)-208(n) (generally referred to as appliance(s) 208 or gateway(s) 208). In some embodiments, a client 102 may have the capacity to function as both a client node seeking access to resources provided by a server 204 and as a server 204 providing access to hosted resources for other clients 102.

Although the embodiment shown in FIG. 2 shows one or more networks 206 between the clients 102 and the servers 204, in other embodiments, the clients 102 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 102 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 102 and the servers 204. In some embodiments, appliances 208 may act as a gateway between two or more networks. In other embodiments, one or more of the appliances 208 may instead be implemented in conjunction with or as part of a single one of the clients 102 or servers 204 to allow such device to connect directly to one of the networks 206. In some embodiments, one of more appliances 208 may operate as an application delivery controller (ADC) to provide one or more of the clients 102 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 102.

In yet other embodiments, a server 204 may execute a virtual machine providing, to a user of a client 102, access to a computing environment. The client 102 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 102 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
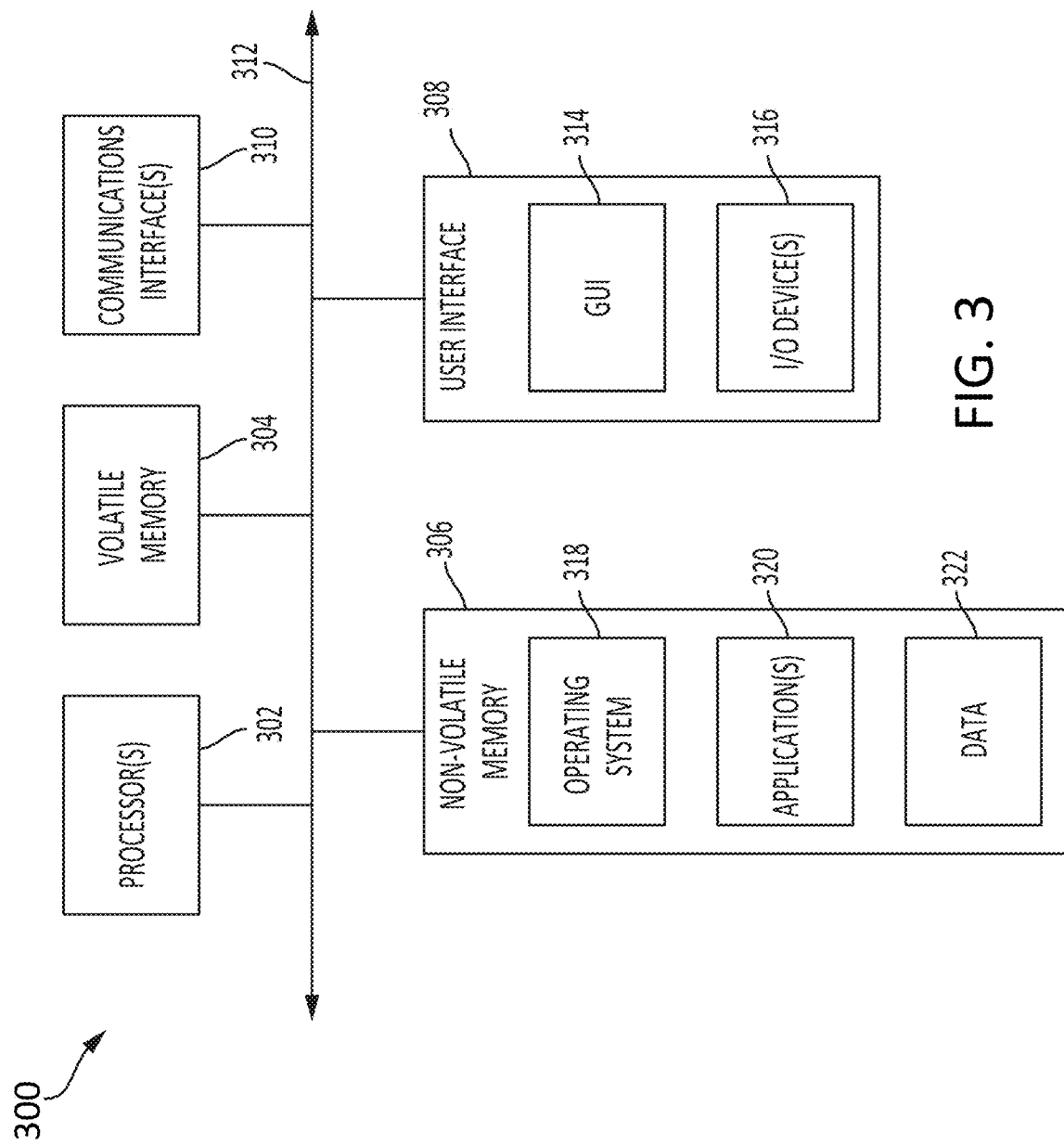
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 102, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 102, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 102 shown in FIG. 2), may execute a virtual machine, which provides an execution session within which applications execute on behalf of a user or a client computing device (e.g., a client 102 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
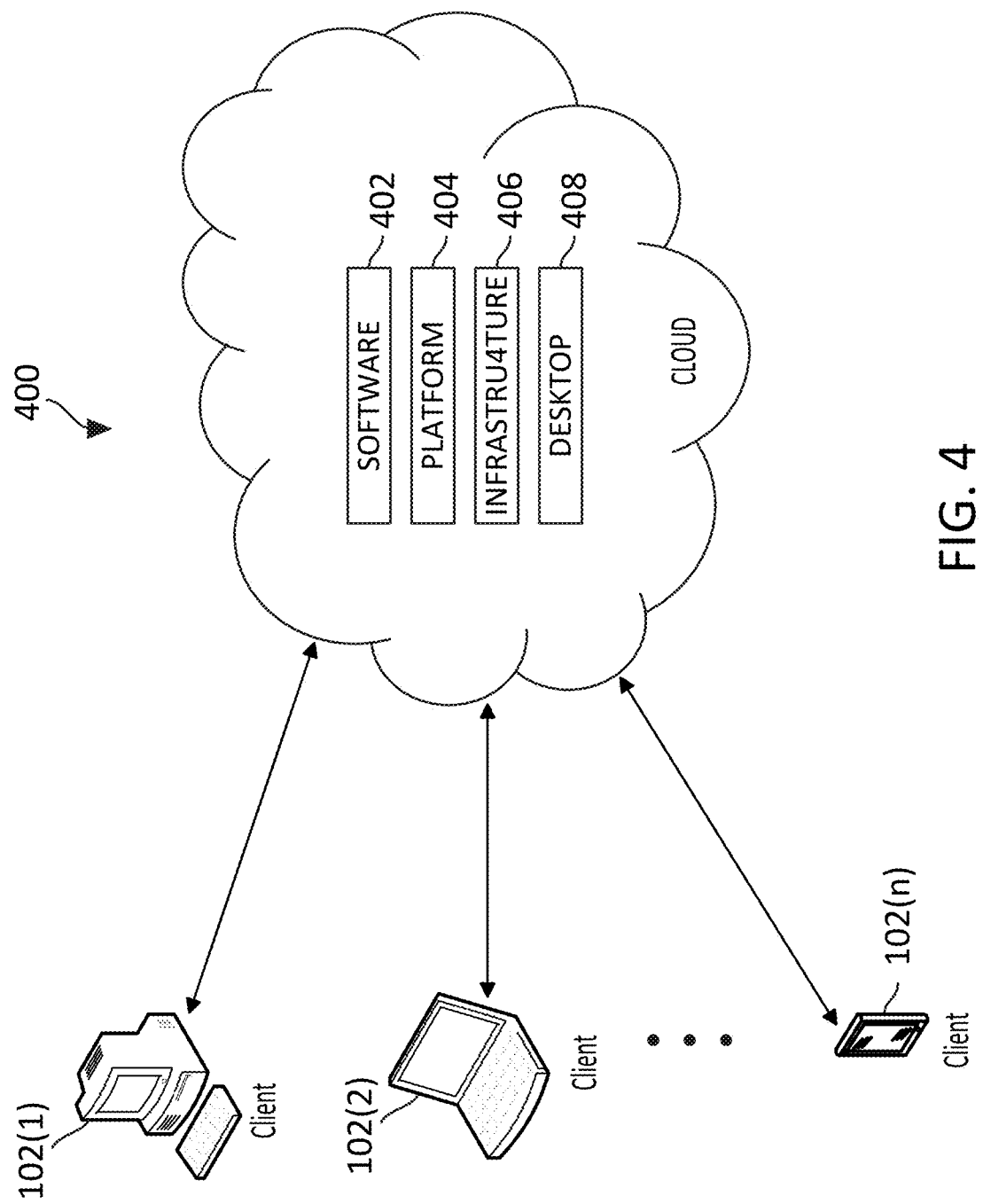
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 102 (such as those described in connection with FIG. 2) are in communication with a cloud network 404. The cloud network 404 may include back-end platforms, e.g., servers, storage, server farms and/or data centers. The clients 102 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 102 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 102 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 102. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 102. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Providing File Sharing Over Network(s)

Figure 5A:
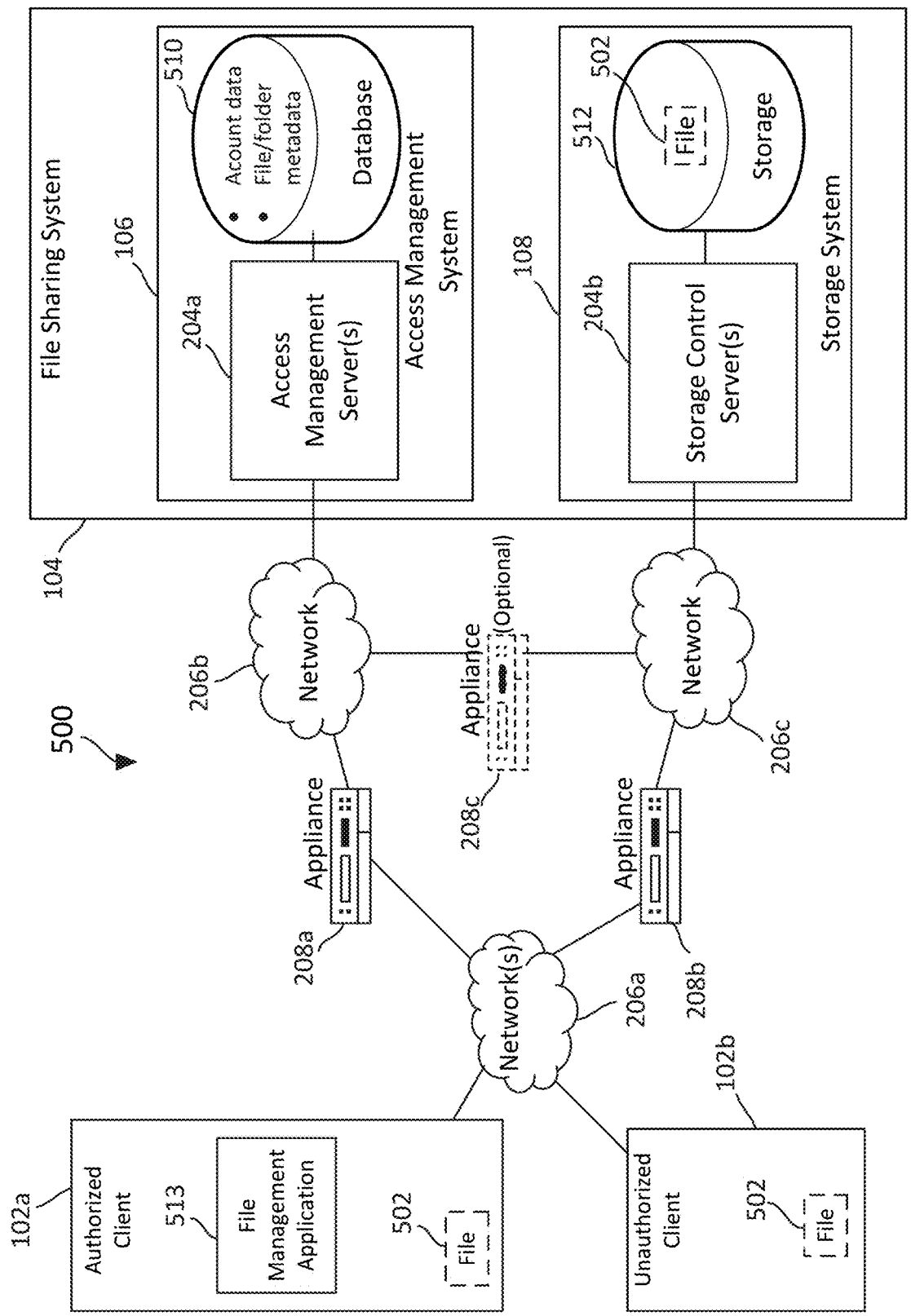
FIG. 5A is a diagram illustrating how a network computing environment like that shown in FIG. 2 may be configured to allow clients access to an example embodiment of a server-based file sharing system.

FIG. 5A shows an example network environment 500 for allowing an authorized client 102a and/or an unauthorized client 102b to upload a file 502 to a file sharing system 104 or download a file 502 from the file sharing system 104. The authorized client 102a may, for example, be a client 102 operated by a user having an active account with the file sharing system 104, while the unauthorized client 102b may be operated by a user who lacks such an account. As shown, in some embodiments, the authorized client 102a may include a file management application 513 with which a user of the authorized client 102a may access and/or manage the accessibility of one of more files 502 via the file sharing system 104. The file management application 513 may, for example, be a mobile or desktop application installed on the authorized client 102a (or in a computing environment accessible by the authorized client). The ShareFile® mobile app and the ShareFile® desktop app offered by Citrix Systems, Inc., of Fort Lauderdale, Fla., are examples of such preinstalled applications. In other embodiments, rather than being installed on the authorized client 102a, the file management application 513 may be executed by a web server (included with the file sharing system 104 or elsewhere) and provided to the authorized client 102a via one or more web pages.

As FIG. 5A illustrates, in some embodiments, the file sharing system 104 may include an access management system 106 and a storage system 108. As shown, the access management system 106 may include one or more access management servers 204a and a database 510, and the storage system 108 may include one or more storage control servers 204b and a storage medium 512. In some embodiments, the access management server(s) 204a may, for example, allow a user of the file management application 513 to log in to his or her account, e.g., by entering a user name and password corresponding to account data stored in the database 510. Once the user of the client 102a has logged in, the access management server 204a may enable the user to view (via the authorized client 102a) information identifying various folders represented in the storage medium 512, which is managed by the storage control server(s) 204b, as well as any files 502 contained within such folders. File/folder metadata stored in the database 510 may be used to identify the files 502 and folders in the storage medium 512 to which a particular user has been provided access rights.

In some embodiments, the clients 102a, 102b may be connected to one or more networks 206a (which may include the Internet), the access management server(s) 204a may include webservers, and an appliance 208a may load balance requests from the authorized client 102a to such webservers. The database 510 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 102a, 102b are shown is FIG. 5A as stand-alone computers, it should be appreciated that one or both of the clients 102*a*, 102*b* shown in FIG. 5A may instead represent other types of computing devices or systems that can be operated by users. In some embodiments, for example, one or both of the authorized client 102*a* and the unauthorized client 102*b* may be implemented as a server-based virtual computing environment that can be remotely accessed using a separate computing device operated by users, such as described above.

In some embodiments, the access management system 106 may be logically separated from the storage system 108, such that files 502 and other data that are transferred between clients 102 and the storage system 108 do not pass through the access management system 106. Similar to the access management server(s) 204*a*, one or more appliances 208*b* may load-balance requests from the clients 102*a*, 102*b* received from the network(s) 206*a* (which may include the Internet) to the storage control server(s) 204*b*. In some embodiments, the storage control server(s) 204*b* and/or the storage medium 512 may be hosted by a cloud-based service provider (e.g., Amazon Web Services™ or Microsoft Azure™). In other embodiments, the storage control server(s) 204*b* and/or the storage medium 512 may be located at a data center managed by an enterprise of a client 102, or may be distributed among some combination of a cloud-based system and an enterprise system, or elsewhere.

After a user of the authorized client 102*a* has properly logged in to an access management server 204*a*, the server 204*a* may receive a request from the client 102*a* for access to one of the files 502 or folders to which the logged in user has access rights. The request may either be for the authorized client 102*a* to itself to obtain access to a file 502 or folder or to provide such access to the unauthorized client 102*b*. In some embodiments, in response to receiving an access request from an authorized client 102*a*, the access management server 204*a* may communicate with the storage control server(s) 204*b* (e.g., either over the Internet via appliances 208*a* and 208*b* or via an appliance 208*c* positioned between networks 206*b* and 206*c*) to obtain a token generated by the storage control server 204*b* that can subsequently be used to access the identified file 502 or folder.

In some implementations, the generated token may, for example, be sent to the authorized client 102*a*, and the authorized client 102*a* may then send a request for a file 502, including the token, to the storage control server(s) 102*b*. In other implementations, the authorized client 102*a* may send the generated token to the unauthorized client 102*b* so as to allow the unauthorized client 102*b* to send a request for the file 502, including the token, to the storage control server(s) 204*b*. In yet other implementations, an access management server 204*a* may, at the direction of the authorized client 102*a*, send the generated token directly to the unauthorized client 102*b* so as to allow the unauthorized client 102*b* to send a request for the file 502, including the token, to the storage control server(s) 204*b*. In any of the forgoing scenarios, the request sent to the storage control server(s) 204*b* may, in some embodiments, include a uniform resource locator (URL) that resolves to an internet protocol (IP) address of the storage control server(s) 204*b*, and the token may be appended to or otherwise accompany the URL. Accordingly, providing access to one or more clients 102 may be accomplished, for example, by causing the authorized client 102*a* to send a request to the URL address, or by sending an email, text message or other communication including the token-containing URL to the unauthorized client 102*b*, either directly from the access management server(s) 204*a* or indirectly from the access management server(s) 204*a* to the authorized client 102*a* and then from the authorized client 102*a* to the unauthorized client 102*b*. In some embodiments, selecting the URL or a user interface element corresponding to the URL, may cause a request to be sent to the storage control server(s) 204*b* that either causes a file 502 to be downloaded immediately to the client that sent the request, or may cause the storage control server 204*b* to return a webpage to the client that includes a link or other user interface element that can be selected to effect the download.

In some embodiments, a generated token can be used in a similar manner to allow either an authorized client 102*a* or an unauthorized client 102*b* to upload a file 502 to a folder corresponding to the token. In some embodiments, for example, an "upload" token can be generated as discussed above when an authorized client 102*a* is logged in and a designated folder is selected for uploading. Such a selection may, for example, cause a request to be sent to the access management server(s) 204*a*, and a webpage may be returned, along with the generated token, that permits the user to drag and drop one or more files 502 into a designated region and then select a user interface element to effect the upload. The resulting communication to the storage control server(s) 204*b* may include both the to-be-uploaded file(s) 502 and the pertinent token. On receipt of the communication, a storage control server 204*b* may cause the file(s) 502 to be stored in a folder corresponding to the token.

In some embodiments, sending a request including such a token to the storage control server(s) 204*b* (e.g., by selecting a URL or user-interface element included in an email inviting the user to upload one or more files 502 to the file sharing system 104), a webpage may be returned that permits the user to drag and drop one or more files 502 into a designated region and then select a user interface element to effect the upload. The resulting communication to the storage control server(s) 204*b* may include both the to-be-uploaded file(s) 502 and the pertinent token. On receipt of the communication, a storage control server 204*b* may cause the file(s) 502 to be stored in a folder corresponding to the token.

In the described embodiments, the clients 102, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 102, servers 204 and/or appliances 208 and/or 212 may correspond to respective computing systems, groups of computing systems, or networks of distributed computing systems, such as computing system 300 shown in FIG. 3.

As discussed above in connection with FIG. 5A, in some embodiments, a file sharing system may be distributed between two sub-systems, with one subsystem (e.g., the access management system 106) being responsible for controlling access to files 502 stored in the other subsystem (e.g., the storage system 108). FIG. 5B illustrates conceptually how one or more clients 102 may interact with two such subsystems.

As shown in FIG. 5B, an authorized user operating a client 102, which may take on any of numerous forms, may log in to the access management system 106, for example, by entering a valid user name and password. In some embodiments, the access management system 106 may include one or more webservers that respond to requests from the client 102. The access management system 106 may store metadata concerning the identity and arrangements of files 502 (shown in FIG. 5A) stored by the storage system 108, such as folders maintained by the storage system 108 and any files 502 contained within such folders. In some embodiments, the metadata may also include permission metadata identifying the folders and files 502 that respective users are allowed to access. Once logged in, a user may employ a user-interface mechanism of the client 102 to navigate among folders for which the metadata indicates the user has access permission.

In some embodiments, the logged-in user may select a particular file 502 the user wants to access and/or to which the logged-in user wants a different user of a different client 102 to be able to access. Upon receiving such a selection from a client 102, the access management system 106 may take steps to authorize access to the selected file 502 by the logged-in client 102 and/or the different client 102. In some embodiments, for example, the access management system 106 may interact with the storage system 108 to obtain a unique "download" token which may subsequently be used by a client 102 to retrieve the identified file 502 from the storage system 108. The access management system 106 may, for example, send the download token to the logged-in client 102 and/or a client 102 operated by a different user. In some embodiments, the download token may a single-use token that expires after its first use.

In some embodiments, the storage system 108 may also include one or more webservers and may respond to requests from clients 102. In such embodiments, one or more files 502 may be transferred from the storage system 108 to a client 102 in response to a request that includes the download token. In some embodiments, for example, the download token may be appended to a URL that resolves to an IP address of the webserver(s) of the storage system 108. Access to a given file 502 may thus, for example, be enabled by a "download link" that includes the URL/token. Such a download link may, for example, be sent the logged-in client 102 in the form of a "DOWNLOAD" button or other user-interface element the user can select to effect the transfer of the file 502 from the storage system 108 to the client 102. Alternatively, the download link may be sent to a different client 102 operated by an individual with which the logged-in user desires to share the file 502. For example, in some embodiments, the access management system 106 may send an email or other message to the different client 102 that includes the download link in the form of a "DOWNLOAD" button or other user-interface element, or simply with a message indicating "Click Here to Download" or the like. In yet other embodiments, the logged-in client 102 may receive the download link from the access management system 106 and cut-and-paste or otherwise copy the download link into an email or other message the logged in user can then send to the other client 102 to enable the other client 102 to retrieve the file 502 from the storage system 108.

In some embodiments, a logged-in user may select a folder on the file sharing system to which the user wants to transfer one or more files 502 (shown in FIG. 5A) from the logged-in client 102, or to which the logged-in user wants to allow a different user of a different client 102 to transfer one or more files 502. Additionally or alternatively, the logged-in user may identify one or more different users (e.g., by entering their email addresses) the logged-in user wants to be able to access one or more files 502 currently accessible to the logged-in client 102.

Similar to the file downloading process described above, upon receiving such a selection from a client 102, the access management system 106 may take steps to authorize access to the selected folder by the logged-in client 102 and/or the different client 102. In some embodiments, for example, the access management system 106 may interact with the storage system 108 to obtain a unique "upload token" which may subsequently be used by a client 102 to transfer one or more files 502 from the client 102 to the storage system 108. The access management system 106 may, for example, send the upload token to the logged-in client 102 and/or a client 102 operated by a different user.

One or more files 502 may be transferred from a client 102 to the storage system 108 in response to a request that includes the upload token. In some embodiments, for example, the upload token may be appended to a URL that resolves to an IP address of the webserver(s) of the storage system 108. For example, in some embodiments, in response to a logged-in user selecting a folder to which the user desires to transfer one or more files 502 and/or identifying one or more intended recipients of such files 502, the access management system 106 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 102 to the storage system 108.

In some embodiments, in response to a logged-in user selecting a folder to which the user wants to enable a different client 102 operated by a different user to transfer one or more files 502, the access management system 106 may generate an upload link that may be sent to the different client 102. For example, in some embodiments, the access management system 106 may send an email or other message to the different client 102 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 104. The returned webpage may also include a user-interface element, e.g., in the form of an "UPLOAD" button, that the different user can select to effect the transfer of the file(s) 502 from the client 102 to the storage system 108. In other embodiments, the logged-in user may receive the upload link from the access management system 106 and may cut-and-paste or otherwise copy the upload link into an email or other message the logged-in user can then send to the different client 102 to enable the different client to upload one or more files 502 to the storage system 108.

In some embodiments, in response to one or more files 502 being uploaded to a folder, the storage system 108 may send a message to the access management system 106 indicating that the file(s) 502 have been successfully uploaded, and an access management system 106 may, in turn, send an email or other message to one or more users indicating the same. For user's that have accounts with the file sharing system 104, for example, a message may be sent to the account holder that includes a download link that the account holder can select to effect the transfer of the file 502 from the storage system 108 to the client 102 operated by the account holder. Alternatively, the message to the account holder may include a link to a webpage from the access management system 106 inviting the account holder to log in to retrieve the transferred files 502. Likewise, in circumstances in which a logged-in user identifies one or more intended recipients for one or more to-be-uploaded files 502 (e.g., by entering their email addresses), the access management system 106 may send a message including a download link to the designated recipients (e.g., in the manner described above), which such designated recipients can then use to effect the transfer of the file(s) 502 from the storage system 108 to the client(s) 102 operated by those designated recipients.

Figure 5C:
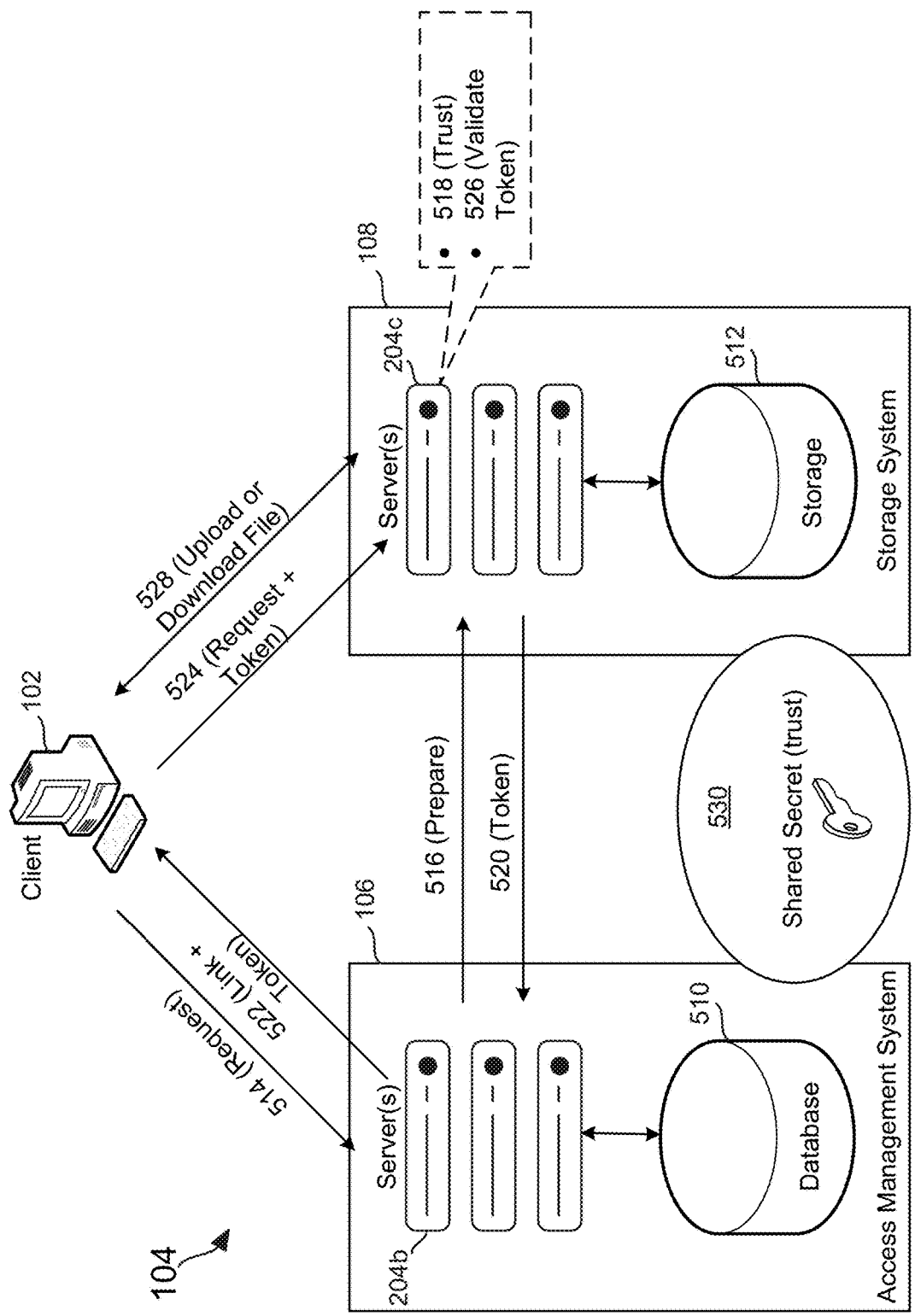
FIG. 5C is a diagram illustrating additional operations that may be performed by the file sharing system shown in FIG. 5A in accordance with some embodiments.

FIG. 5C is a block diagram showing an example of a process for generating access tokens (e.g., the upload tokens and download tokens discussed above) within the file sharing system 104 described in connection with FIGS. 5A and 5B.

As shown, in some embodiments, a logged-in client 102 may initiate the access token generation process by sending an access request 514 to the access management server(s) 204*b*. As noted above, the access request 514 may, for example, correspond to one or more of (A) a request to enable the downloading of one or more files 502 (shown in FIG. 5A) from the storage system 108 to the logged-in client 102, (B) a request to enable the downloading of one or more files 502 from the storage system 108 to a different client 102 operated by a different user, (C) a request to enable the uploading of one or more files 502 from a logged-in client 102 to a folder on the storage system 108, (D) a request to enable the uploading of one or more files 502 from a different client 102 operated by a different user to a folder of the storage system 108, (E) a request to enable the transfer of one or more files 502, via the storage system 108, from a logged-in client 102 to a different client 102 operated by a different user, or (F) a request to enable the transfer of one or more files 502, via the storage system 108, from a different client 102 operated by a different user to a logged-in client 102.

In response to receiving the access request 514, an access management server 204*a* may send a "prepare" message 516 to the storage control server(s) 204*b* of the storage system 108, identifying the type of action indicated in the request, as well as the identity and/or location within the storage medium 512 of any applicable folders and/or files 502. As shown, in some embodiments, a trust relationship may be established (step 518) between the storage control server(s) 204*b* and the access management server(s) 204*a*. In some embodiments, for example, the storage control server(s) 204*b* may establish the trust relationship by validating a hash-based message authentication code (HMAC) based on shared secret or key 530).

After the trust relationship has been established, the storage control server(s) 204*b* may generate and send (step 520) to the access management server(s) 204*a* a unique upload token and/or a unique download token, such as those as discussed above.

After the access management server(s) 204*a* receive a token from the storage control server(s) 204*b*, the access management server(s) 204*a* may prepare and send a link 522 including the token to one or more client(s) 102. In some embodiments, for example, the link may contain a fully qualified domain name (FQDN) of the storage control server(s) 204*b*, together with the token. As discussed above, the link 522 may be sent to the logged-in client 102 and/or to a different client 102 operated by a different user, depending on the operation that was indicated by the request.

The client(s) 102 that receive the token may thereafter send a request 524 (which includes the token) to the storage control server(s) 204*b*. In response to receiving the request, the storage control server(s) 204*b* may validate (step 526) the token and, if the validation is successful, the storage control server(s) 204*b* may interact with the client(s) 102 to effect the transfer (step 528) of the pertinent file(s) 502, as discussed above.

F. Detailed Description of Example Embodiments of a Data Access Control System

As described above, the system 100 may require the signing key in order to modify a file. In order to require that at least one user and at least one supervisor are present and authorizing the modification of the file, the system 100 may divide the signing key into a first portion (e.g., primary signing subkey) and a second portion (e.g., secondary signing subkey). FIG. 6A illustrates a first example of generating signing fragments using a signing key and a secret sharing protocol 600 in accordance with some embodiments. For example, FIG. 6A illustrates dividing a signing key 610 (e.g., original secret) into a primary signing subkey 620 and a secondary signing subkey 625.

Using a secret sharing protocol, the system 100 may use the primary signing subkey 620 to generate primary signing fragments 630. As illustrated in FIG. 6A, the system 100 may generate a first total number N of primary signing fragments 630, such that users of N total users may receive a primary signing fragment 630 (e.g., 630(1), 630(2), . . . 630(N)). The system 100 may divide the primary signing subkey 620 such that any combination of n primary signing fragments 630 may reconstruct the primary signing subkey 620 using the secret sharing protocol. Thus, n is a first minimum number of primary users that are required to be present when modifying the file. If n−1 primary users are present, such that the system 100 only has n−1 primary signing fragment 630, the system 100 is unable to reconstruct the primary signing subkey 620.

Similarly, the system 100 may further divide the secondary signing subkey 625 into secondary signing fragments 635. As illustrated in FIG. 6A, the system 100 may generate a second total number M of in secondary signing fragments 635, such that each secondary user of M total secondary users may receive a secondary signing fragment 635 (e.g., 635(1), 635(2), . . . 635(M)). The system 100 may divide the secondary signing subkey 625 such that any combination of m secondary signing fragments 635 may reconstruct the secondary signing subkey 625 using the secret sharing protocol. Thus, m is a second minimum number of secondary users that are required to be present when modifying the file. If m−1 secondary users are present, such that the system 100 only has m−1 secondary signing fragments 635, the system 100 is unable to reconstruct the secondary signing subkey 625.

Secret sharing (also called secret splitting) refers to methods for distributing a secret amongst a group of participants, each of whom is allocated a share of the secret. The secret can be reconstructed when a sufficient number, of possibly different types, of shares are combined together; individual shares are of no use on their own. As used herein, data sharing techniques that utilize secret sharing may be referred to as "secret sharing protocols" and the system 100 may use secret sharing protocols to generate fragments (e.g., shares, pieces of data, etc.) that correspond to a subkey (e.g., original secret). For example, the system 100 may reconstruct the subkey using some of the fragments. Thus, the fragments themselves do not correspond to portions of the subkey, but represent data that can be used by the secret sharing protocol to reconstruct the subkey.

Figure 6A:
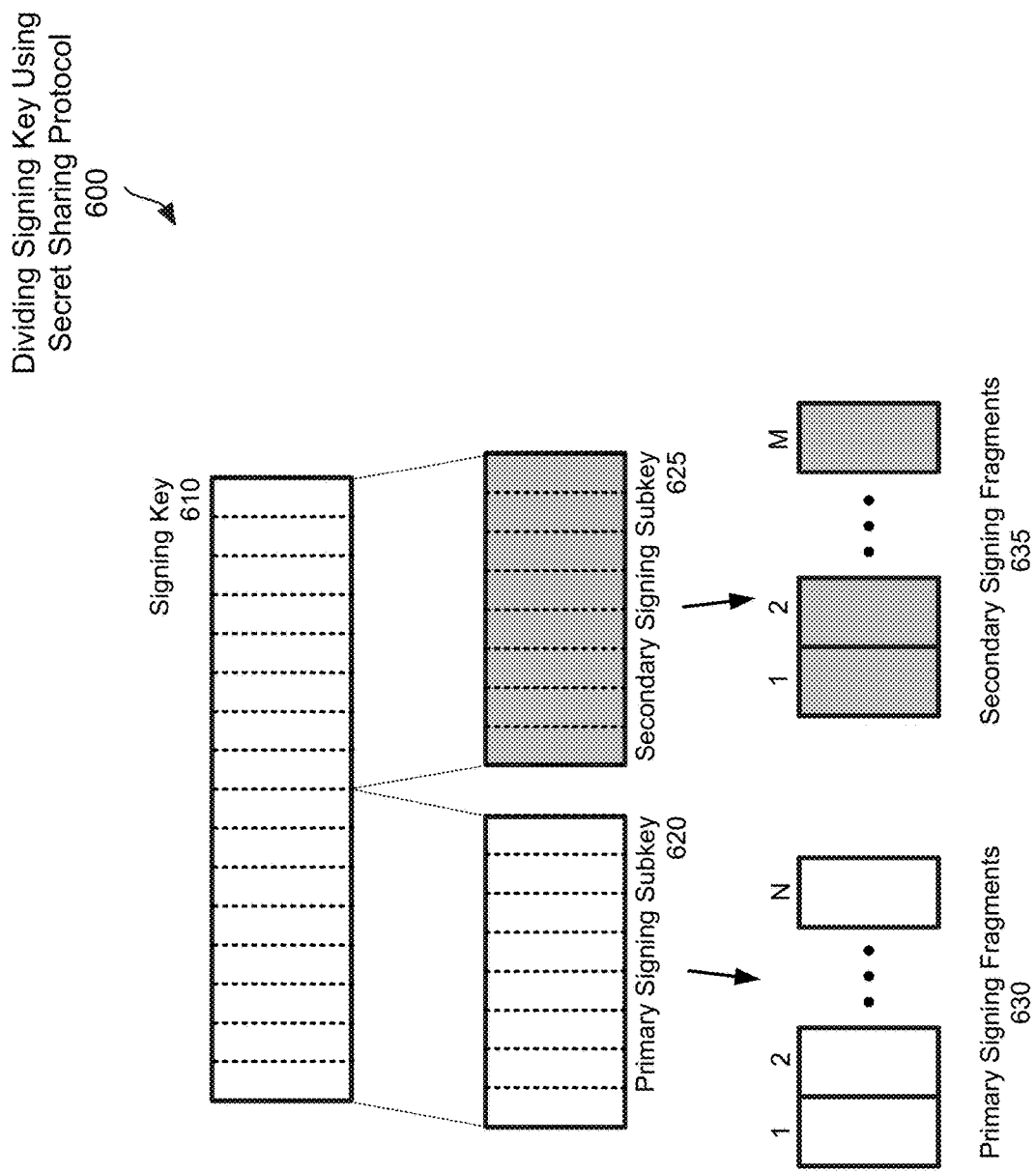
FIG. 6A depicts a first example of generating signing fragments using a signing key and a secret sharing protocol in accordance with some embodiments.

As illustrated in FIG. 6A, in some examples the system 100 may divide the signing key 610 into two portions, a primary signing subkey 620 (e.g., first secret) and a secondary signing subkey 625 (e.g., second secret). The system 100 may use the primary signing subkey 620 and the secret sharing protocols to generate the primary signing fragments 630, such that a portion of the primary signing fragments 630 may be used to reconstruct the primary signing subkey 620 (e.g., original first secret). Similarly, the system 100 may use the secondary signing subkey 625 and the secret sharing protocols to generate the secondary signing fragments 635, such that a portion of the secondary signing fragments 635 may be used to reconstruct the secondary signing subkey 625 (e.g., original second secret).

One example implementation of a suitable secret sharing protocol is Shamir's secret sharing protocol. Using Shamir's secret sharing protocol, the "secret" (e.g., primary signing subkey 620) may be split into multiple parts, called "shares" (e.g., primary signing fragments 630), with each primary user being given a unique share corresponding to the secret. To reconstruct the original secret, Shamir's secret sharing protocol requires a minimum number of shares (e.g., primary signing fragments 630), which is called the threshold. For example, the system 100 may use Shamir's secret sharing protocol to reconstruct the primary signing subkey 620 when the minimum number of primary signing fragments 630 are present.

To illustrate an example using Shamir's secret sharing protocol, the primary signing subkey 620 may correspond to a first secret, represented as a first value S (e.g., S=1234). The system 100 may determine to generate a first number N (e.g., N=6) of primary signing fragments 630, where a second number n (e.g., n=3) of primary signing fragments 630 may be used to reconstruct the first secret. For example, the system 100 may randomly obtain n−1 coefficient values based on the second number n. In this example, the system 100 may obtain two coefficient values, a first coefficient value $a_1$ (e.g., 166) and a second coefficient value $a_2$ (e.g., 94), although these coefficient values are intended to conceptually illustrate an example and the disclosure is not limited thereto. Using the first value S and the coefficient values, the system 100 may generate a polynomial that is specific to the primary signing subkey 620, with a second number n of indeterminates raised to nonnegative integer powers, such as:

$$f(x)=1234+166x+94x^2 \quad [1]$$

Using the polynomial represented in Equation [1], the system 100 may construct six data points in the form $D_{x-1}=(x, f(x))$, such as $D_1=(1, 1494)$, $D_2=(2, 1942)$, $D_3=(3, 2578)$, $D_4=(4, 3402)$, $D_5=(5, 4414)$, and $D_6=(6, 5614)$. Thus, the system 100 may generate the first number N (e.g., N=6) of primary signing fragments 630, where the system 100 may use the second number n (e.g., n=3) of primary signing fragments 630 to reconstruct the first secret (e.g., first value S). For example, the system 100 may use any three data points from the six data points above to reconstruct the polynomial represented in Equation [1], which includes the first value S (e.g., S=1234), from which the system 100 may identify the first secret. Thus, the data points (e.g., primary signing fragments 630) may be used to reconstruct the first secret (e.g., primary signing subkey 620), but the primary signing fragments 630 may not correspond to portions of the primary signing subkey 620.

While an example of using Shamir's secret sharing protocol is described above, the disclosure is not limited thereto and the system 100 may generate the primary signing subkey 620 and the primary signing fragments 630 using any techniques known to one of skill in the art without departing from the disclosure.

As part of creating a file, an owner of the file may indicate the first minimum number of primary signing fragments and the second minimum number of secondary signing fragments required to modify the file. For example, the owner of a first file may require a single primary user (e.g., one primary signing fragment) and multiple secondary users (e.g., two or more secondary signing fragments) to edit the first file, the owner of a second file may require multiple primary users (e.g., two or more primary signing fragments) and a single secondary user (e.g., one secondary signing fragment) to edit the second file, while the owner of a third file may require multiple primary users and multiple secondary users to edit the third file. The disclosure is not limited thereto and the first minimum number of primary signing fragments and the second minimum number of secondary signing fragments may vary without departing from the disclosure.

In some examples, the first minimum number of primary signing fragments may be a subset of the total number of primary signing fragments. Thus, only a portion of the first total number of primary signing fragments are required to modify the file, such that the first minimum number n of primary signing fragments 630 is less than the first total number N of primary signing fragments 630 (e.g., n<N). For example, a first file may be associated with 3+ primary users and the system 100 may require that only 1-2 primary users be present and provide primary signing fragments 630 in order to modify the first file. However, the disclosure is not limited thereto and in other examples the first total number of primary signing fragments are required to modify the file, such that the first minimum number n of primary signing fragments 630 may be equal to the first total number N of primary signing fragments 630 (e.g., n=N). For example, a second file may be associated with two primary users and the system 100 may require that both primary users be present and provide primary signing fragments 630 in order to modify the second file.

Similarly, in some examples the second minimum number of secondary signing fragments may be a subset of the second total number of secondary signing fragments. Thus, only a portion of the second total number of secondary signing fragments 635 are required to modify the file, such that the second minimum number m of secondary signing fragments 635 is less than a second total number M of secondary signing fragments 635 (e.g., m<M). For example, a third file may be associated with 3+ secondary users and the system 100 may require that only 1-2 secondary users be present and provide secondary signing fragments 635 in order to modify the third file. However, the disclosure is not limited thereto and in other examples the second total number of secondary signing fragments 635 are required to modify the file, such that the second minimum number m of secondary signing fragments 635 may be equal to the second total number M of secondary signing fragments 635 (e.g., m=M). For example, a fourth file may be associated with two secondary users and the system 100 may require that both secondary users be present and provide secondary signing fragments 635 in order to modify the fourth file.

In some examples, the first minimum number n of primary signing fragments 630 may be equal to the second minimum number m of secondary signing fragments 635. For example, the system 100 may require two primary users and two secondary users to be present to modify a file. However, the disclosure is not limited thereto and the first minimum number n of primary signing fragments 630 may be different than the second minimum number m of secondary signing fragments 635 without departing from the disclosure. Additionally or alternatively, the first total number N of primary signing fragments 630 may be equal to the second total number M of secondary signing fragments 635. For example, the system 100 may divide the signing key 610 using the same number of primary users and secondary users without departing from the disclosure. However, the disclosure is not limited thereto and the first total number N of primary signing fragments 630 may be different than the second total number M of secondary signing fragments 635 without departing from the disclosure.

Figure 6B:
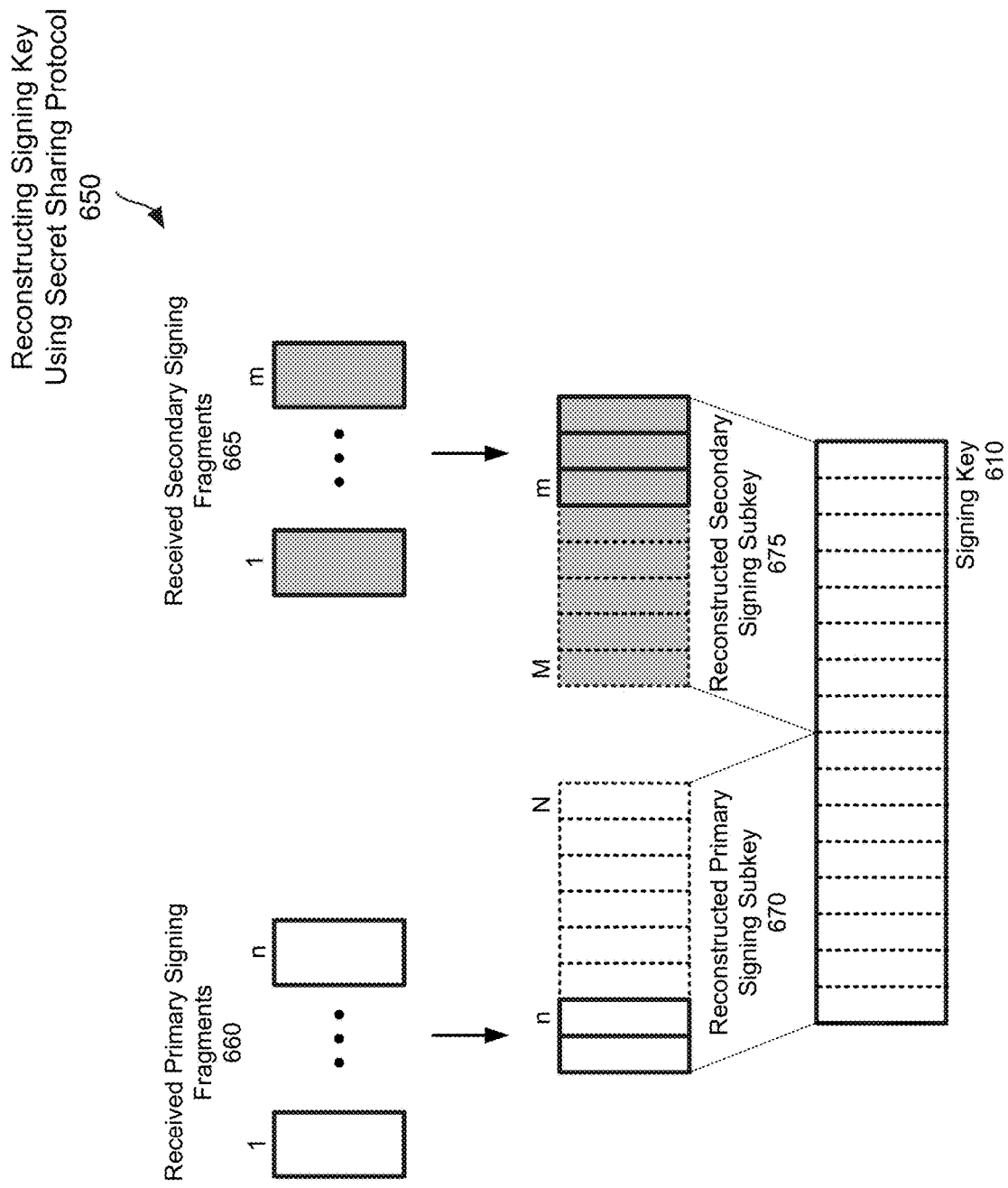
FIG. 6B depicts a second example of reconstructing a signing key using signing fragments and a secret sharing protocol in accordance with some embodiments.

FIG. 6B illustrates a second example of a technique 650 to reconstruct a signing key using signing fragments and a secret sharing protocol in accordance with some embodiments. For example, FIG. 6B illustrates that the system 100 may receive n received primary signing fragments 660 (e.g., 1, 2, . . . n) and m received secondary signing fragments 665 (e.g., 1, 2, . . . m).

Using the secret sharing protocol and the n received primary signing fragments 660, the system 100 may generate reconstructed primary signing subkey 670 that is equivalent to the primary signing subkey 620 described above with regard to FIG. 6A. As illustrated in FIG. 6B, while the system 100 received n of the primary signing fragments 630, the system 100 may use the secret sharing protocol to generate the reconstructed primary signing subkey 670.

Similarly, using the secret sharing protocol and the m received secondary signing fragments 665, the system 100 may generate reconstructed secondary signing subkey 675 that is equivalent to the secondary signing subkey 625 described above with regard to FIG. 6A. As illustrated in FIG. 6B, while the system 100 only received m of the secondary signing fragments 635, the system 100 may use the secret sharing protocol to generate the reconstructed secondary signing subkey 675.

For ease of illustration, FIG. 6B illustrates the reconstructed primary signing subkey 670 corresponding to the first total number N of primary signing fragments. For example, in some examples the reconstructed primary signing subkey 670 may correspond to N equally divided portions such that the secret sharing protocol determines the reconstructed primary signing subkey 670 by determining the N primary signing fragments. However, the disclosure is not limited thereto, and in some examples the N primary signing fragments may be different from the reconstructed primary signing subkey 670 without departing from the disclosure. For example, the primary signing fragments may correspond or otherwise apply to first data that may be used to determine the reconstructed primary signing subkey 670, but the reconstructed primary signing subkey 670 corresponds or otherwise applies to second data different than the first data without departing from the disclosure. An example implementation of first data and second data is described above with regard to Shamir's secret sharing protocol, although the disclosure is not limited thereto.

As described above with regard to FIG. 1B, the system 100 may use the signing key to modify a file. However, the system 100 may use an encryption key to view the file. If the system 100 grants read access to primary users and/or secondary users, the system 100 may send the encryption key to the primary users and/or the secondary users. However, in some examples the system 100 may restrict read access so that the file can only be viewed in the presence of a first minimum number of primary users and a second minimum number of secondary users. For example, the system 100 may use the secret sharing protocol to divide the encryption key into individual primary encryption fragments and secondary encryption fragments using the same techniques described above with regard to FIGS. 6A-6B.

Figure 7A:
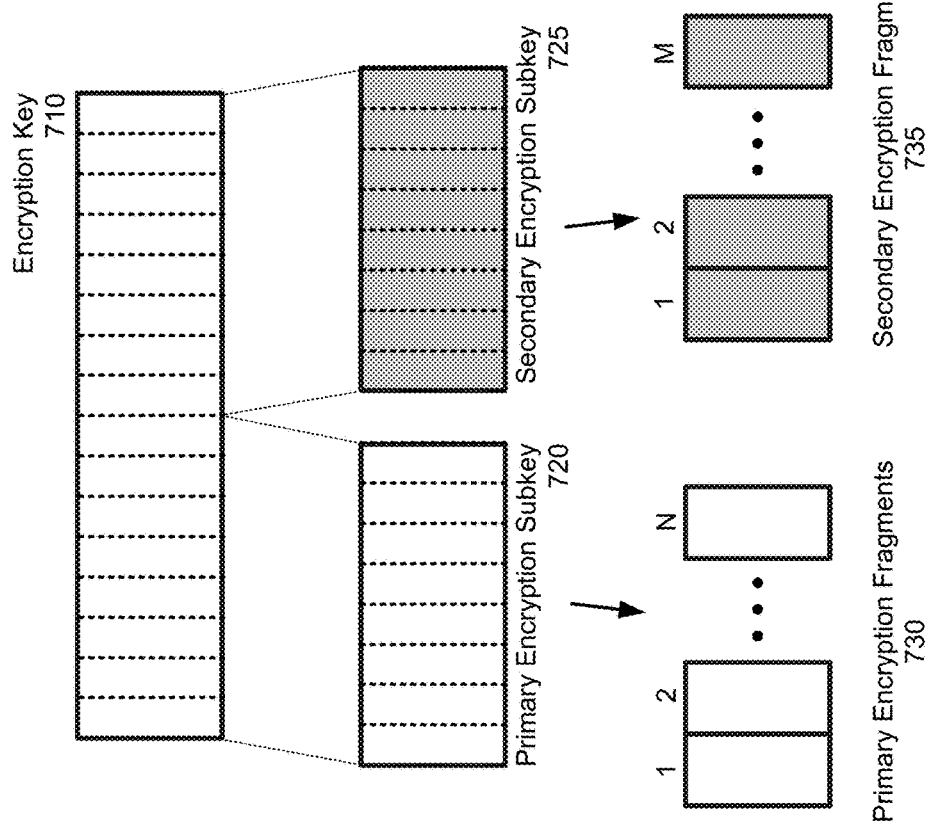
FIG. 7A depicts a first example of generating encryption fragments using an encryption key and a secret sharing protocol in accordance with some embodiments.

FIG. 7A illustrates a first example of a technique 700 for generating encryption fragments using an encryption key and a secret sharing protocol in accordance with some embodiments. For example, FIG. 7A illustrates that an encryption key 710 may be divided into a primary encryption subkey 720 and a secondary encryption subkey 725. Further, the system 100 may use the primary encryption key 720 to generate a first total number N of primary encryption fragments 730 (e.g., 1, 2, . . . N) using the secret sharing protocol, as described above with regard to FIGS. 6A-6B. Similarly, the system 100 may use the supervisor encryption key 725 to generate a second total number M of secondary encryption fragments 735 (e.g., 1, 2, . . . M) using the secret sharing protocol, as described above with regard to FIGS. 6A-6B.

Figure 7B:
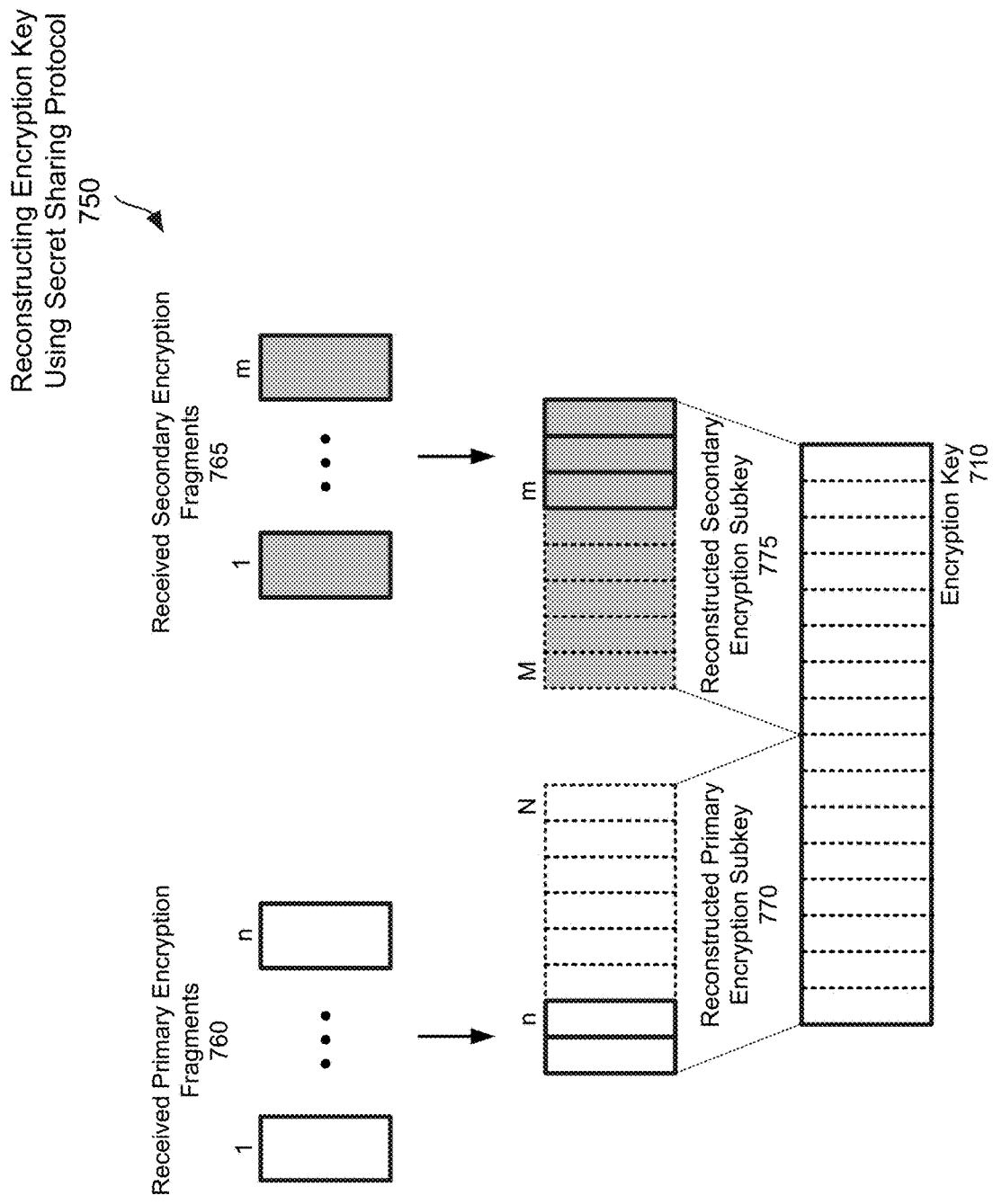
FIG. 7B depicts a second example of reconstructing an encryption key using encryption fragments and a secret sharing protocol in accordance with some embodiments.

FIG. 7B illustrates a second example of a technique 750 for reconstructing an encryption key using encryption fragments and a secret sharing protocol in accordance with some embodiments. As illustrated in FIG. 7B, the system 100 may use a first minimum number n of received primary encryption fragments 760 (e.g., 1, 2, . . . n) to generate a reconstructed primary encryption subkey 770 that corresponds or otherwise applies to the primary encryption subkey 720 illustrated in FIG. 7A. Similarly, the system 100 may use a second minimum number m of received secondary encryption fragments 765 (e.g., 1, 2, . . . m) to generate a reconstructed secondary encryption subkey 775 that corresponds or otherwise applies to the secondary encryption subkey 725 illustrated in FIG. 7A. Using the reconstructed primary encryption subkey 770 and the reconstructed secondary encryption subkey 775, the system 100 may generate the encryption key 710 to view the file.

For ease of illustration, FIGS. 7A-7B illustrate the system 100 using the same number of encryption fragments to view the file as the number of signing fragments required to modify the file. However, the disclosure is not limited thereto and in some examples the system 100 may require a different number of encryption fragments to view the file than the number of signing fragments required to modify the file without departing from the disclosure. For example, the system 100 may require a first number $n_1$ of primary signing fragments and a second number $m_1$ of secondary signing fragments to modify the file, while requiring a third number $n_2$ of primary encryption fragments and a fourth number $m_2$ of secondary encryption fragments to view the file. Thus, the system 100 may require a single primary user and a single secondary user to be present to view the file, while requiring two or more primary users and two or more secondary users be present to modify the file, although the disclosure is not limited thereto.

Figure 8A:
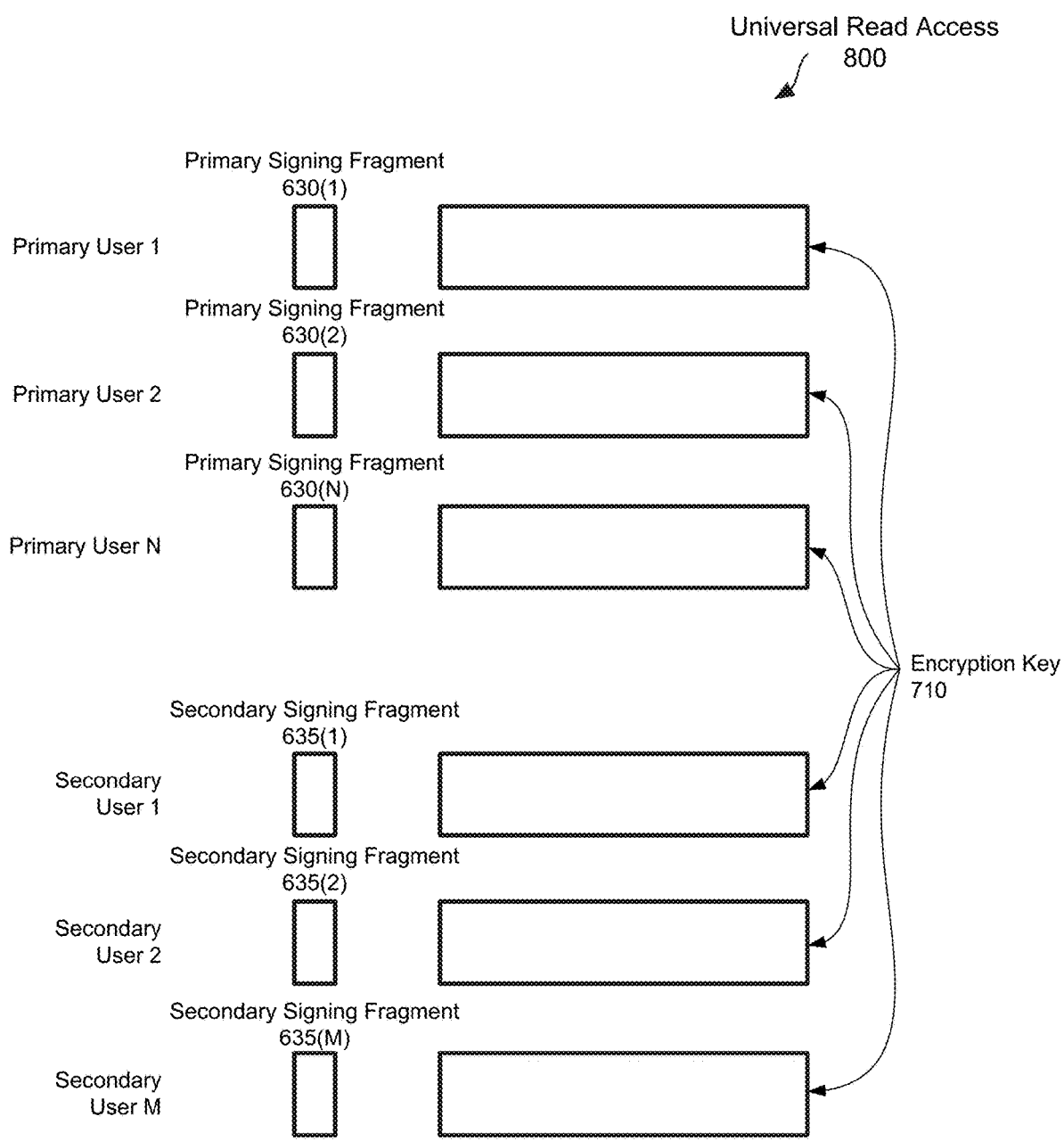
FIG. 8A depicts a first example of generating primary and secondary fragments for universal read access in accordance with some embodiments.

FIG. 8A depicts a first example of generating primary and secondary fragments for universal read access in accordance with some embodiments. As described above, in some examples the system 100 may grant universal read access 800 such that any of the primary users and/or secondary users may store an encryption key locally on a client 102 and may view the file on their own on the client 102 using the encryption key.

This is illustrated in FIG. 8A, with the N total primary users and the M total secondary users receiving the encryption key 710. For example, the system 100 may send a first primary signing fragment 630(1) and the encryption key 710 to a first client 102(1) of a first primary user (e.g., Primary User 1), a second primary signing fragment 630(2) and the encryption key 710 to a second client 102(2) of a second primary user (e.g., Primary User 2), and an N-th primary signing fragment 630(N) and the encryption key 710 to an N-th client 102(N) of an N-th primary user (e.g., Primary User N).

Similarly, the system 100 may send a first secondary signing fragment 635(1) and the encryption key 710 to an (N+1)-th client 102(N+1) of a first secondary user (e.g., Secondary User 1), a second secondary signing fragment 635(2) and the encryption key 710 to an (N+2) client 102(N+2) of a second secondary user (e.g., Secondary User 2), and an M-th secondary signing fragment 635(M) and the encryption key 710 to an (N+M)-th client 102(N+M) of an M-th secondary user (e.g., Secondary User N).

In some examples, the system 100 may restrict read access to a file such that multiple primary users and/or secondary users must be present to view the file. For example, the system 100 may divide the encryption key using the secret sharing protocol, as described above with regard to FIGS. 7A-7B. Thus, primary users and/or secondary users may store encryption fragments locally on the client 102 and may thus be unable to view the file on their own using the encryption fragments. Instead, the system 100 requires that the client 102 receive the first minimum number n of primary encryption fragments and the second minimum number m of secondary encryption fragments in order to reconstruct the encryption key 710 and view the file.

Figure 8B:
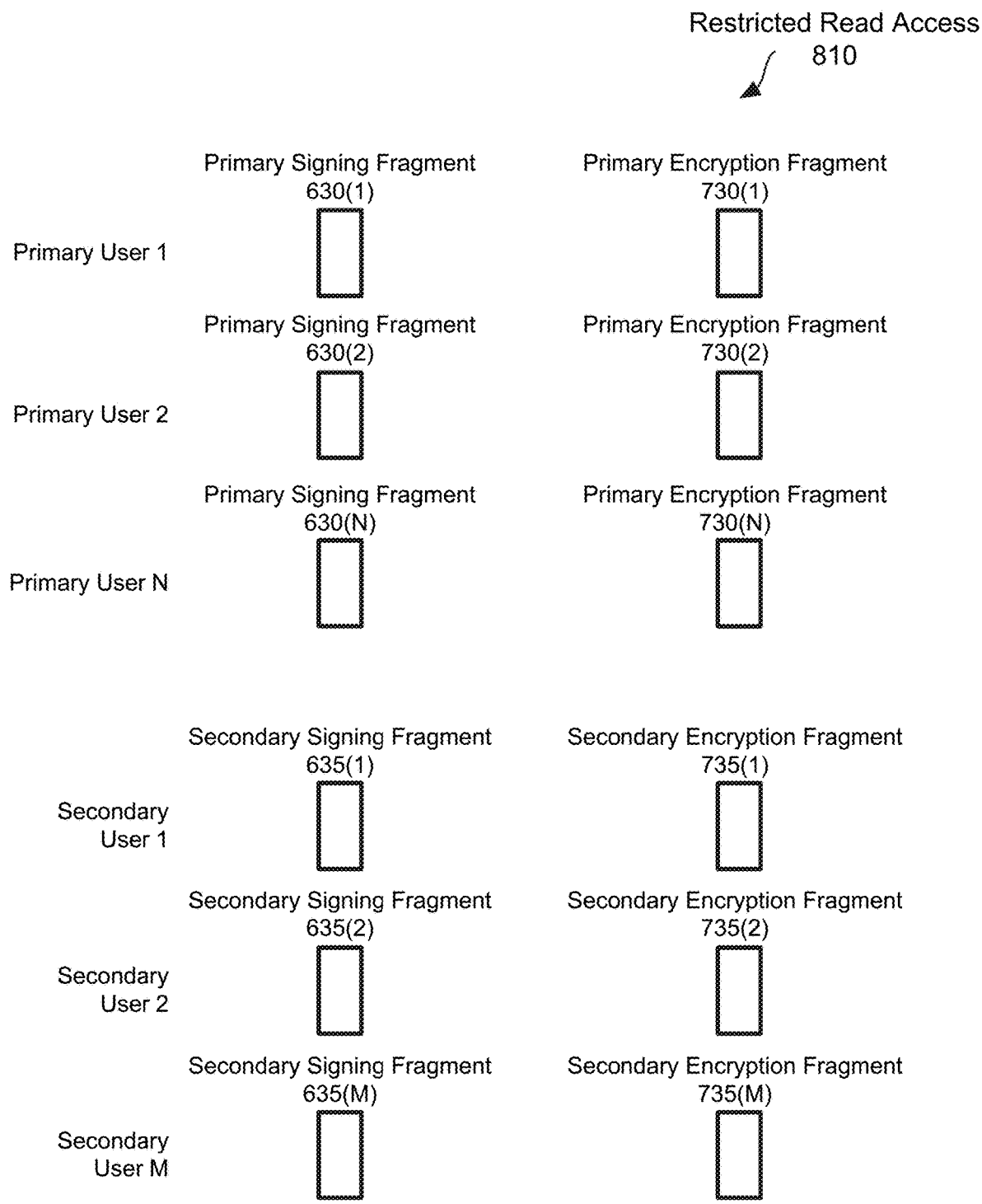
FIG. 8B depicts a second example of generating primary and secondary fragments for restricted read access in accordance with some embodiments.

FIG. 8B depicts a second example of generating primary and secondary fragments for restricted read access in accordance with some embodiments. An example of restricted read access 810 is illustrated in FIG. 8B, with N total primary users receiving primary encryption fragments 730 and M total secondary users receiving secondary encryption fragments 735. For example, the system 100 may send a first primary signing fragment 630(1) and a first primary encryption fragment 730(1) to a first client 102(1) of a first primary user (e.g., Primary User 1), a second primary signing fragment 630(2) and a second primary encryption fragment 730(2) to a second client 102(2) of a second primary user (e.g., Primary User 2), and an N-th primary signing fragment 630(N) and an N-th primary encryption fragment 730(N) to an N-th client 102(N) of an N-th primary user (e.g., Primary User N).

Similarly, the system 100 may send a first secondary signing fragment 635(1) and a first secondary encryption fragment 735(1) to an (N+1)-th client 102(N+1) of a first secondary user (e.g., Secondary User 1), a second secondary signing fragment 635(2) and a second secondary encryption fragment 735(2) to an (N+2) client 102(N+2) of a second secondary user (e.g., Secondary User 2), and an M-th secondary signing fragment 635(M) and an M-th secondary encryption fragment 735(M) to an (N+M)-th client 102(N+M) of an M-th secondary user (e.g., Secondary User N).

Figure 9A:
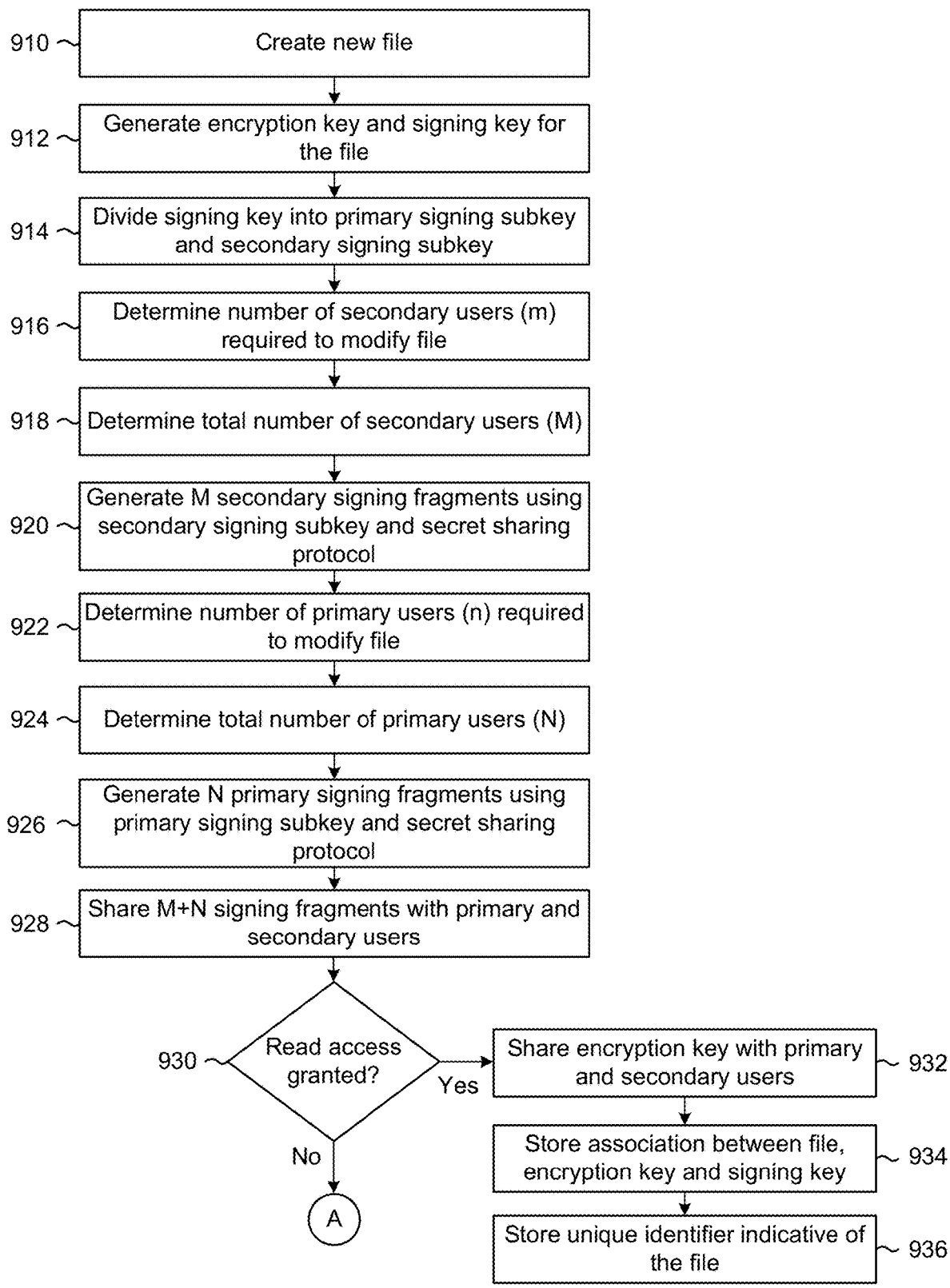
FIG. 9A is a first portion of a flowchart illustrating example methods for generating signing fragments and/or encryption fragments using a secret sharing protocol in accordance with some embodiments.

FIG. 9A is a first portion of a flowchart illustrating example methods for generating signing fragments and/or encryption fragments using a secret sharing protocol in accordance with some embodiments. As illustrated in FIG. 9A, the system 100 may create (910) a new file and generate (912) an encryption key and a signing key for the file. As described in greater detail above, the encryption key may grant permission to view the file while the signing key may grant permission to modify the file.

The system 100 may divide (914) the signing key into a secondary signing subkey (e.g., secondary subkey) and a primary signing subkey (e.g., primary subkey). For ease of illustration, the disclosure may refer to the secondary subkey and the secondary signing subkey interchangeably, and may refer to the primary subkey and the primary signing subkey interchangeably. This reflects that in some examples the secret sharing protocol may only be applied to the signing key, such that the system 100 sends an encryption key to the clients 102 (e.g., grants universal read access). In examples in which the system 100 also applies the secret sharing protocol to the encryption key (e.g., restricts read access), the disclosure may refer to a secondary encryption subkey and a primary encryption subkey, as described below with regard to steps 938-950.

The user signing subkey may be associated with (e.g., assigned, mapped, linked, identified with, etc.) one or more primary users (e.g., person that performs an action on the file), while the secondary signing key may be associated with (e.g., assigned, mapped, linked, identified with, etc.) one or more secondary users (e.g., person that supervises the action taken by the one or more primary users). By separating the user signing subkey and the secondary signing subkey, the system 100 requires that at least one primary user and at least one secondary user be present in order to modify the file. The system 100 may further require that two or more primary users and/or two or more secondary users be present in order to modify the file. For example, the system 100 may select the first minimum number n of primary users and the second minimum number m of secondary users required to modify the file.

As illustrated in FIG. 9A, the system 100 may determine (916) a number of secondary users (m) required to modify the file, determine (918) a total number of secondary users (M), and may generate (920) M secondary signing fragments using the secondary signing subkey and a secret sharing protocol. For example, the system 100 may generate M unique secondary signing fragments, of which the second minimum number m of secondary signing fragments may be used to reconstruct the secondary signing subkey. Thus, the system 100 may reconstruct the secondary signing subkey in order to modify the file when the system 100 receives m secondary signing fragments, but the system 100 is unable to reconstruct the secondary signing subkey using m−1 secondary signing fragments.

As illustrated in FIG. 9A, the system 100 may determine (922) a number of primary users (n) required to modify the file, determine (924) a total number of primary users (N), and may generate (926) N primary signing fragments using the primary signing subkey and the secret sharing protocol. For example, the system 100 may generate N primary signing fragments, of which the first minimum number n of primary signing fragments may be used to reconstruct the primary signing subkey. Thus, the system 100 may reconstruct the primary signing subkey in order to modify the file when the system 100 receives n primary signing fragments, but the system 100 is unable to reconstruct the primary signing subkey using n−1 primary signing fragments.

The system 100 may share (928) the M+N signing fragments (e.g., M secondary signing fragments and N primary signing fragments) with the primary user(s) and the secondary user(s). For example, the system 100 may send the primary/secondary signing fragments to clients 102 of the primary user(s) and the secondary user(s). In some examples, the number of primary users (n) may be equal to the total number of primary users (N) without departing from the disclosure. Similarly, in some examples the number of secondary users (m) may be equal to the total number of secondary users (M) without departing from the disclosure. However, the disclosure is not limited thereto and the number of primary users, the total number of primary users (N), the number of secondary users (m), and/or the total number of secondary users (M) may vary without departing from the disclosure.

The system 100 may determine (930) whether read access is granted, and, if so, may share (932) the encryption key with the primary user(s) and the secondary user(s), may store (934) an association between the file, the encryption key, and the signing key, and may store (936) a unique identifier indicative of the file. Thus, clients 102 may receive the encryption key, enabling the primary user(s) and/or secondary user(s) to view the file, and the system 100 stores the file together with the encryption key, the signing key, and the unique identifier. In some examples, the system 100 may store the unique identifier without storing the encryption key and/or the signing key, although the disclosure is not limited thereto.

Figure 9B:
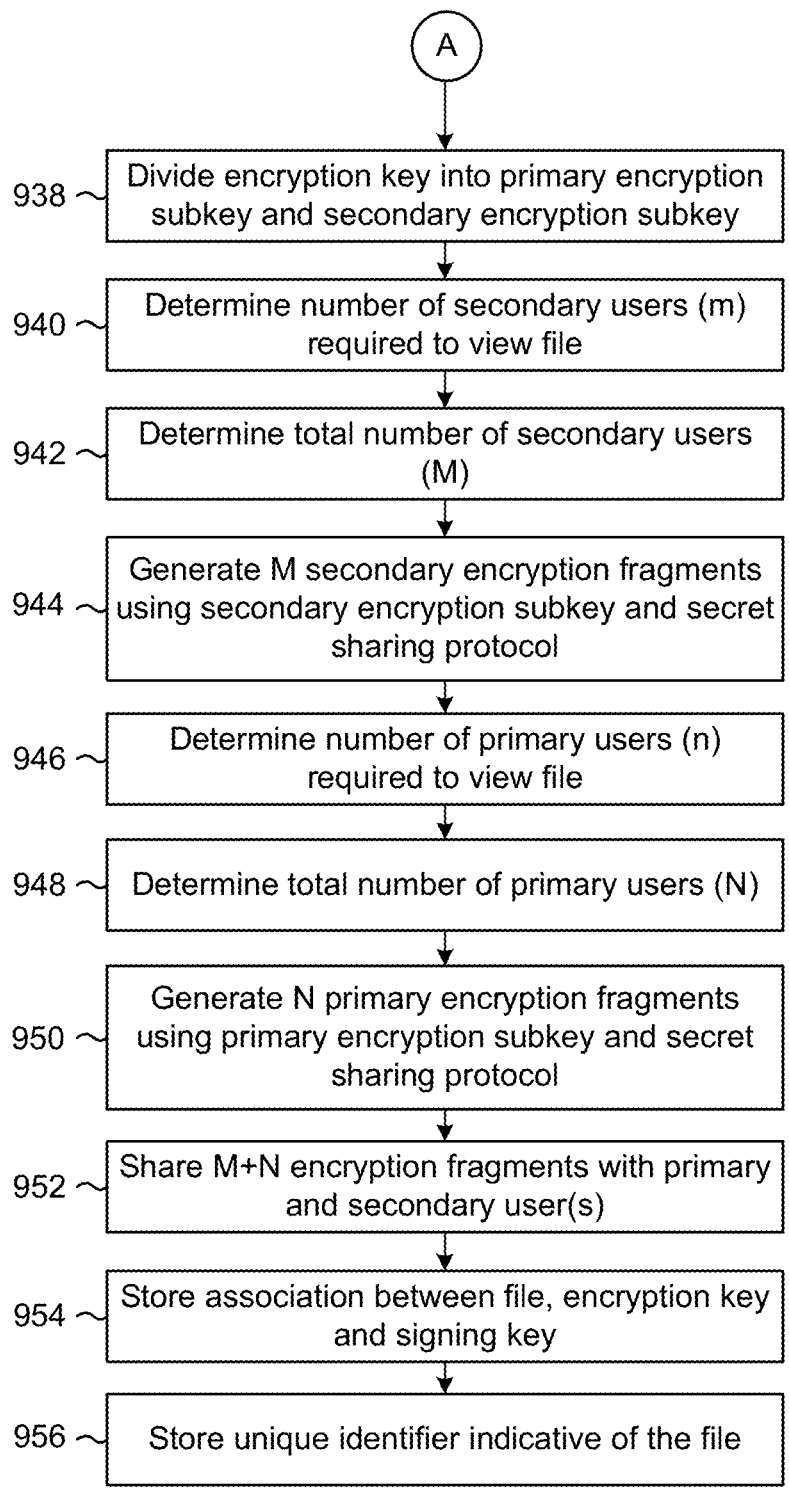
FIG. 9B is a second portion of a flowchart illustrating example methods for generating signing fragments and/or encryption fragments using a secret sharing protocol in accordance with some embodiments.

FIG. 9B is a second portion of a flowchart illustrating example methods for generating signing fragments and/or encryption fragments using a secret sharing protocol in accordance with some embodiments. As illustrated in FIG. 9B, if the system 100 determines that read access is not granted, the system 100 may use the secret sharing protocol to divide the encryption key, as illustrated in FIG. 9B. For example, the system 100 may divide (938) the encryption key into a primary encryption subkey and a secondary encryption subkey.

The system 100 may determine (940) a number of secondary users (m) required to view the file, determine (942) a total number of secondary users (M), and may generate (944) M secondary encryption fragments using the secondary encryption subkey and the secret sharing protocol. For example, the system 100 may generate M unique secondary encryption fragments, of which the second minimum number m of secondary encryption fragments may be used to reconstruct the secondary encryption subkey. Thus, the system 100 may reconstruct the secondary encryption subkey in order to view the file when the system 100 receives m secondary encryption fragments, but the system 100 may be unable to reconstruct the secondary encryption subkey using m−1 secondary encryption fragments.

While FIG. 9B illustrates the system 100 determining the total number of secondary users (M) in step 942, the disclosure is not limited thereto and this step may be omitted without departing from the disclosure. For example, the system 100 may have already determined the total number of secondary users (M) in step 918. However, the disclosure is not limited thereto and the number of secondary users (m) and/or the total number of secondary users (M) may vary between the secondary signing subkey and the secondary encryption subkey without departing from the disclosure. For example, the system 100 may not allow viewing of the file unless a first number of secondary users ($m_1$) are present but permit modification of the file when a second number of secondary users ($m_2$) are present without departing from the disclosure.

As illustrated in FIG. 9B, the system 100 may determine (946) a number of primary users (n) required to view the file, determine (948) a total number of primary users (N), and may divide (950) the user encryption key into N primary encryption fragments using the secret sharing protocol. For example, the system 100 may generate N unique primary encryption fragments, of which the first minimum number n of primary encryption fragments may be used to reconstruct the primary encryption subkey. Thus, the system 100 may reconstruct the primary encryption subkey in order to view the file when the system 100 receives n primary encryption fragments, but cannot reconstruct the primary encryption subkey using n−1 primary encryption fragments.

While FIG. 9B illustrates the system 100 determining the total number of primary users (N) in step 948, the disclosure is not limited thereto and this step may be omitted without departing from the disclosure. For example, the system 100 may have already determined the total number of primary users (N) in step 924. However, the disclosure is not limited thereto and the number of primary users (n) and/or the total number of primary users (N) may vary between the primary signing subkey and the primary encryption subkey without departing from the disclosure. For example, the system 100 may enable viewing of the file when a first number of primary users ($n_1$) are present but allow modification of the file upon a second number of primary users ($n_2$) being present without departing from the disclosure.

The system 100 may share (952) the M+N encryption fragments (e.g., M secondary encryption fragments and N primary encryption fragments) with the primary user(s) and the secondary user(s). For example, the system 100 may send the encryption fragments to clients 102 of the primary user(s) and the secondary user(s). In some examples, the number of primary users (n) may be equal to the total number of primary users (N) without departing from the disclosure. Similarly, in some examples the number of secondary users (m) may be equal to the total number of secondary users (M) without departing from the disclosure. However, the disclosure is not limited thereto and the number of primary users, the total number of primary users (N), the number of secondary users (m), and/or the total number of secondary users (M) may vary without departing from the disclosure.

The system 100 may store (954) an association between the file, the encryption key, and the signing key, and may store (956) a unique identifier indicative of the file. For example, the system 100 may store the file together with the encryption key, the signing key, and the unique identifier, although the disclosure is not limited thereto. In some examples, the system 100 may store the unique identifier without storing the encryption key and/or the signing key, although the disclosure is not limited thereto.

Figure 10A:
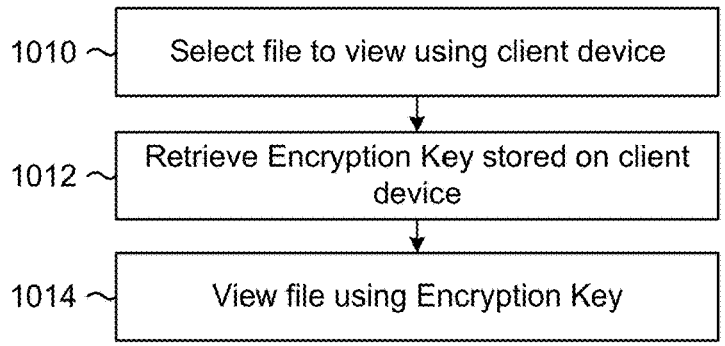
FIG. 10A is a flowchart illustrating a first example method for viewing a file using an encryption key in accordance with some embodiments.
Figure 10B:
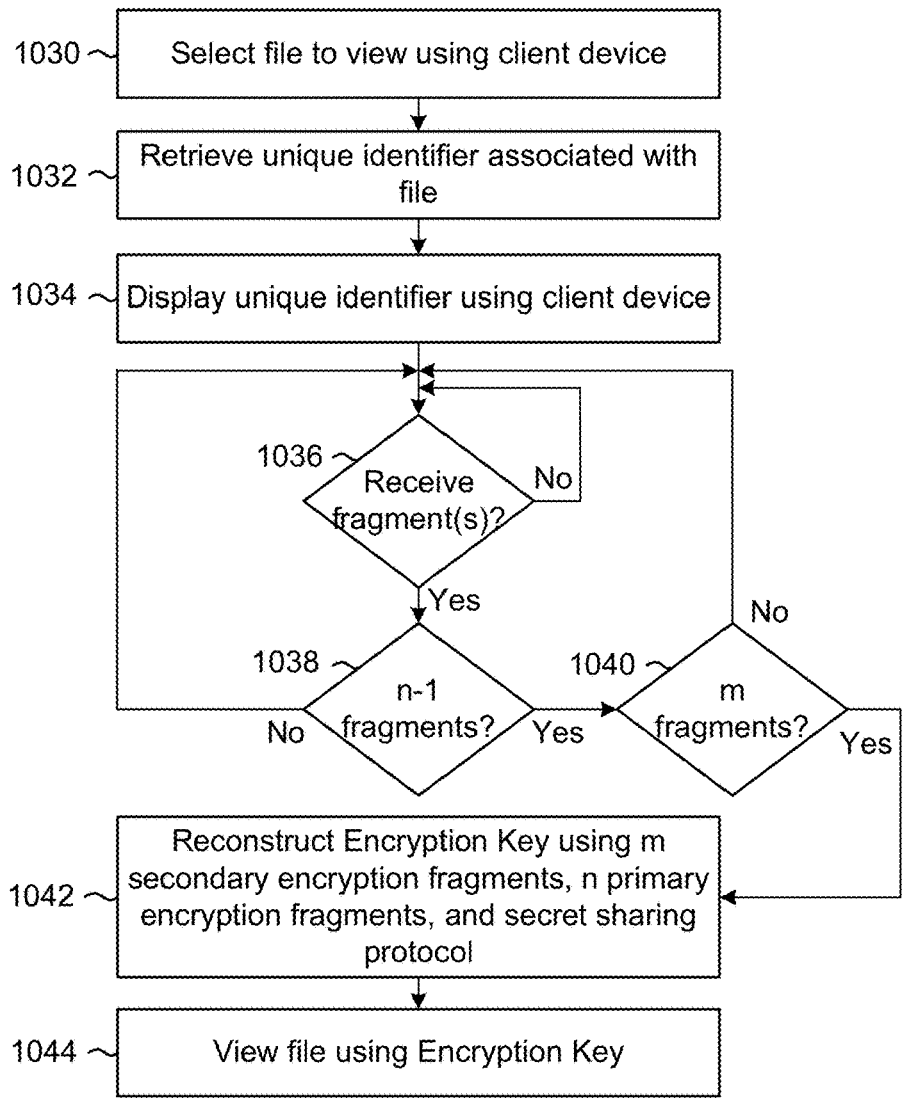
FIG. 10B is a flowchart illustrating a second example method for viewing a file using an encryption key in accordance with some embodiments.

FIGS. 10A-10B are flowcharts illustrating example methods for viewing a file using an encryption key in accordance with some embodiments. In some examples, individual clients 102 may receive the encryption key, enabling the primary user(s) and/or secondary user(s) to view the file, as illustrated in FIG. 10A. In other examples, however, individual clients 102 may receive individual encryption fragments, such that a minimum number of primary user(s) and a minimum number of secondary user(s) be present in order to view the file, as illustrated in FIG. 10B.

As illustrated in FIG. 10A, the system 100 may select (1010) a file to view using a client device, may retrieve (1012) an encryption key stored on the client device, and may view (1014) the file using the encryption key. For example, a first client 102(1) may view the file using the encryption key that is stored on the first client 102(1).

As illustrated in FIG. 10B, the system 100 may select (1030) a file to view using a client device, may retrieve (1032) a unique identifier associated with or otherwise assigned to the file, and may display (1034) the unique identifier using the client device. For example, the first client 102(1) may display the unique identifier to enable a second client 102(2) to capture the unique identifier and perform one or more actions. In some examples, the one or more actions may be included with steps or actions taken by the second client 102(2) to establish a secure connection with the first client 102(1) and transmission of an encryption fragment to the first client 102(1), although the disclosure is not limited thereto. The first client 102(1) may receive encryption fragments from a number of clients 102 and/or the file sharing system 104 without departing from the disclosure.

The system 100 may determine (1036) whether fragment(s) are received, and, if not, may repeat step 1036 until fragment(s) are received. For example, the first client 102(1) may determine whether data is received from another client 102 and/or the file sharing system 104 that corresponds to the file, the unique identifier, the primary encryption fragment, and/or the like using techniques known to one of skill in the art without departing from the disclosure. Once one or more fragment(s) are received in step 1036, the system 100 may determine (1038) whether n−1 primary encryption fragments are received. For example, the first client 102(1) may count a number of primary encryption fragments received from other client(s) 102 and/or the file sharing system 104 using techniques known to one of skill in the art without departing from the disclosure.

If n−1 primary encryption fragments are not received in step 1038, the system 100 may loop to step 1036. If n−1 primary encryption fragments are received in step 1038, which corresponds to the first client 102(1) having n primary encryption fragments for use with reconstruction of the primary encryption subkey, the system 100 may determine (1040) whether m secondary encryption fragments are received. For example, the first client 102(1) may count a number of secondary encryption fragments received from other client(s) 102 and/or the file sharing system 104 using techniques known to one of skill in the art without departing from the disclosure.

If m secondary encryption fragments are not received in step 1040, the system 100 may loop to step 1036. If m secondary encryption fragments are received in step 1040, which corresponds to the first client 102(1) having m secondary encryption fragments for use with reconstruction of the secondary encryption subkey, the system 100 may reconstruct (1042) the encryption key using the m secondary encryption fragments, the n primary encryption fragments, and the secret sharing protocol, as described above with regard to FIG. 7B. For example, the system 100 may reconstruct the primary encryption subkey using the n primary encryption fragments and may reconstruct the secondary encryption subkey using the m secondary encryption fragments. The system 100 may view (1044) the file using the encryption key. For example, the first client 102(1) may reconstruct the encryption key and then view the file using the encryption key.

Figure 11:
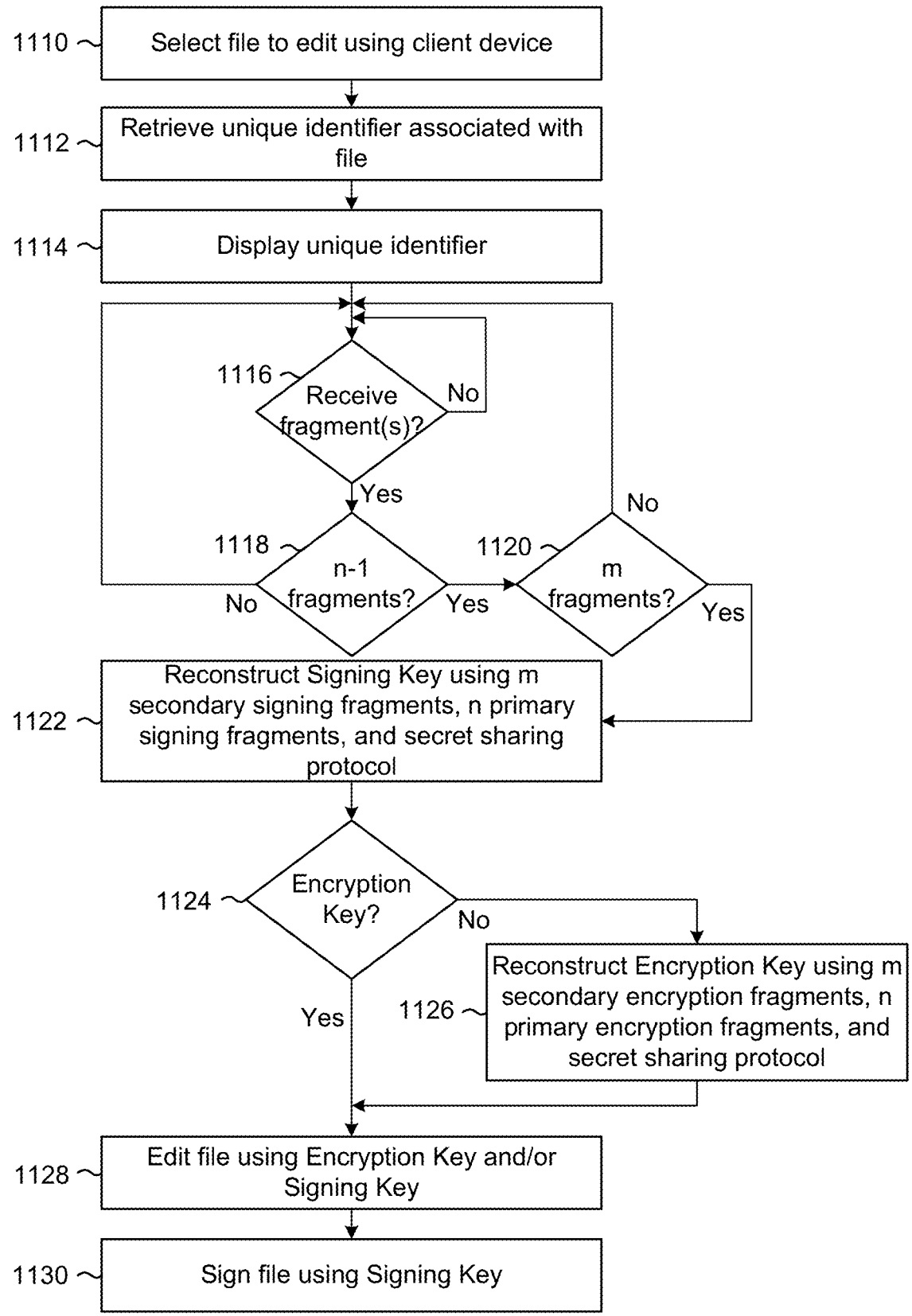
FIG. 11 is a flowchart illustrating an example method for reconstructing a signing key using a secret sharing protocol to modify a file in accordance with some embodiments.

FIG. 11 is a flowchart illustrating an example method for reconstructing a signing key using a secret sharing protocol to modify a file in accordance with some embodiments. As illustrated in FIG. 11, the system 100 may select (1110) a file to edit using a client device, may retrieve (1112) a unique identifier of the file, and may display (1114) the unique identifier using the client device. For example, the first client 102(1) may display the unique identifier to enable a second client 102(2) to capture the unique identifier and perform one or more actions. In some examples, the one or more actions may be included in steps or actions taken by the second client 102(2) to establish a secure connection with the first client 102(1) and transmission of an individual signing key and/or an individual encryption key to the first client 102(1), although the disclosure is not limited thereto. The first client 102(1) may receive signing fragments and/or encryption fragments from a number of clients 102 without departing from the disclosure.

The system 100 may determine (1116) whether fragment(s) are received, and, if not, may repeat step 1116 until fragment(s) are received. For example, the first client 102(1) may determine whether data is received from another client 102 and/or the file sharing system 104 that corresponds to the file, the unique identifier, the primary encryption fragment, the primary signing fragment, and/or the like using techniques known to one of skill in the art without departing from the disclosure.

Once one or more fragment(s) are received in step 1116, the system 100 may determine (1118) whether n−1 primary signing fragments are received. For example, the first client 102(1) may count a number of primary signing fragments received from other client(s) 102 and/or the file sharing system 104 using techniques known to one of skill in the art without departing from the disclosure. If n−1 primary signing fragments are not received in step 1118, the system 100 may loop to step 1116. If n−1 primary signing fragments are received in step 1118, which corresponds to the first client 102(1) having n primary signing fragments for reconstruction of the primary signing subkey, the system 100 may determine (1120) whether m secondary signing fragments are received. For example, the first client 102(1) may count a number of secondary signing fragments received from other client(s) 102 and/or the file sharing system 104 using techniques known to one of skill in the art without departing from the disclosure.

If m secondary signing fragments are not received in step 1120, the system 100 may loop to step 1116. If m secondary signing fragments are received in step 1120, which corresponds to the first client 102(1) having m secondary signing fragments for reconstruction of the secondary signing subkey, the system 100 may reconstruct (1122) the signing key using the m secondary signing fragments, the n primary signing fragments, and the secret sharing protocol, as described above with regard to FIG. 6B. For example, the system 100 may reconstruct the primary signing subkey using the n primary signing fragments and may reconstruct the secondary signing subkey using the m secondary signing fragments.

The system 100 may determine (1124) whether the client device has an encryption key to view the file. For example, the first client 102(1) may identify if the file is associated with an encryption key or a primary encryption fragment. In some examples, the first client 102(1) may determine whether the first client 102(1) has an encryption key by attempting to view the file, although the disclosure is not limited thereto.

When the system 100 grants universal read access, for example, the first client 102(1) and additional clients 102 may each store the encryption key and be able to view the file. However, when the system 100 restricts read access, the first client 102(1) may only store a primary encryption fragment and may need to reconstruct the encryption key to view the file. Thus, the first client 102(1) may have received the encryption fragments along with the signing fragments in steps 1116-1120 and may reconstruct (1126) the encryption key using the m secondary encryption fragments, n primary encryption fragments, and the secret sharing protocol.

While FIG. 11 illustrates the system 100 with use of the encryption key, the disclosure is not limited thereto. In some examples, the system 100 may enable the first client 102(1) to both view and modify the file using the signing key. For example, the system 100 may require the encryption key to enable the first client 102(1) to view the file, whereas the system 100 may enable the first client 102(1) to view and modify the file using the signing key without departing from the disclosure. Thus, steps 1124-1126 may be omitted without departing from the disclosure.

After reconstructing the signing key and/or the encryption key, the system 100 may access and edit (1128) the file using the encryption key and/or the signing key and may sign (1130) the file using the signing key. For example, the system 100 may modify contents of the file and/or other data of the file and may optionally attach a signature to the file. The signature may be used to validate the contents of the edited file at a later point in time, such as by the file sharing system 104. In some examples, the system 100 may edit the file using the signing key. For example, the signing key may enable a client device 102 to both view and modify the file without departing from the disclosure. However, the disclosure is not limited thereto and in other examples, the system 100 may use both the encryption key and the signing key in order to view and modify the file without departing from the disclosure. While FIG. 11 illustrates the system 100 editing the file and signing the edited file as two separate steps, the disclosure is not limited thereto and in some examples the system 100 may edit the file and sign the edited file as a single step without departing from the disclosure.

Figure 12:
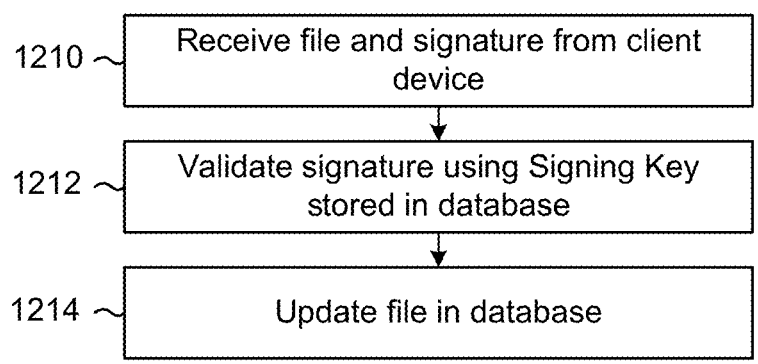
FIG. 12 is a flowchart illustrating an example method for updating a system database in accordance with some embodiments.

FIG. 12 is a flowchart illustrating an example method for updating a system database in accordance with some embodiments. As illustrated in FIG. 12, the system 100 may receive (1210) a file and a signature from a client device, may validate (1212) the signature using a signing key stored in a database, and may update (1214) the file in a database. For example, the one or more servers 204 and/or other components may receive the file and the signature from the client 102(1), may validate the file and/or the signature, and may store an updated version of the file in a database. In some examples, updating the file in the database may correspond to replacing an older version of the file with the updated version of the file received from the client 102(1). However, the disclosure is not limited thereto, and in other examples updating the file in the database may correspond to adding the updated version of the file to the database and/or associating the updated version of the file with older version(s) of the file.

Figure 13:
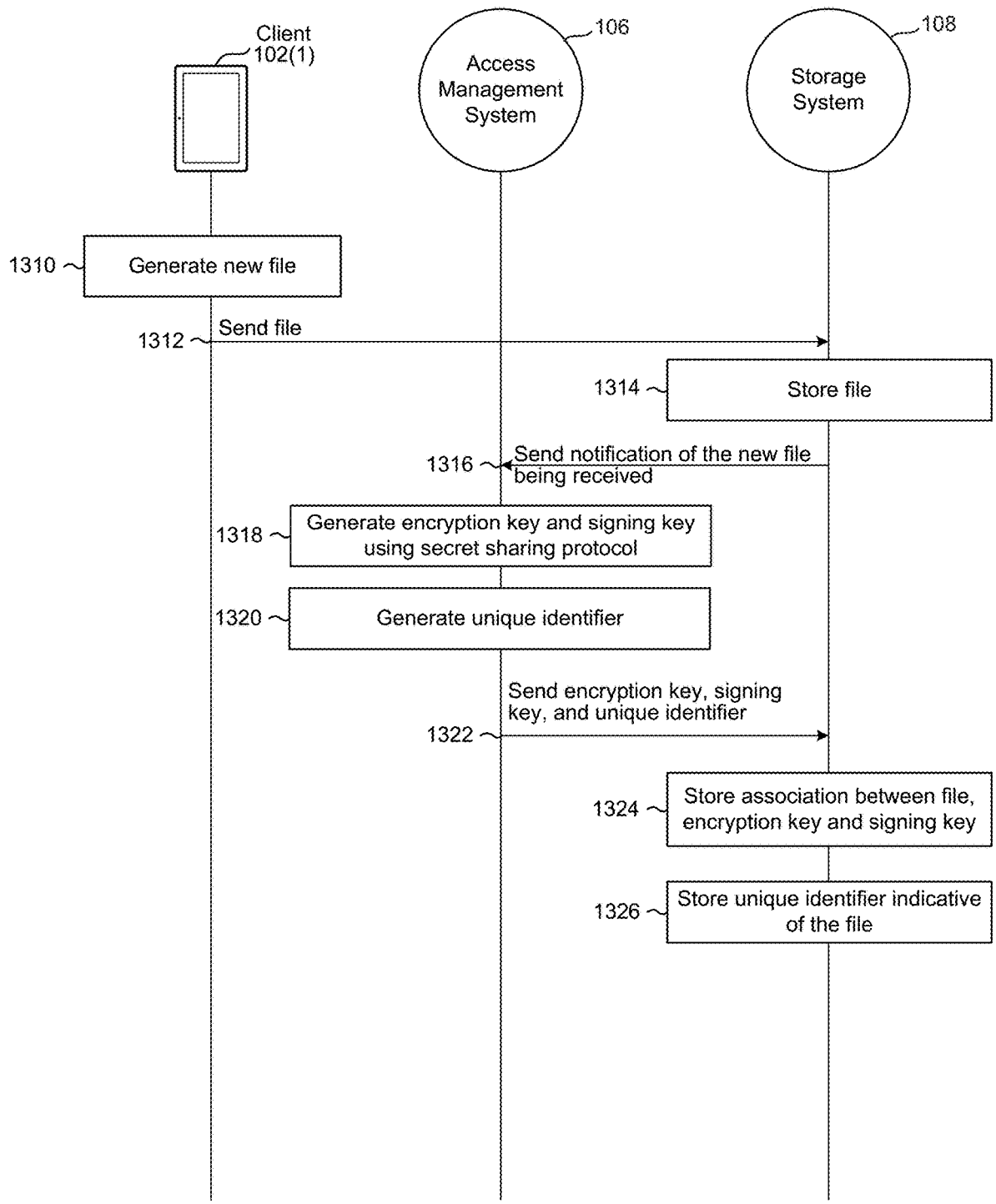
FIG. 13 is a communication diagram illustrating an example method for generating and storing an encryption key and a signing key for a new file in accordance with some embodiments.

FIG. 13 is a communication diagram illustrating an example method for generating and storing an encryption key and a signing key for a new file in accordance with some embodiments. As illustrated in FIG. 13, in some examples a first client 102(1) may generate (1310) a new file and send (1312) the file to the storage system 108 of the file sharing system 104. The storage system 108 may store (1314) the file and send (1316) a notification of the new file being received to the access management system 106. For example, the first client 102(1) may upload the new file to the file sharing system 104 and the access management system 106 may monitor new files stored in the storage system 108. While FIG. 13 illustrates the first client 102(1) sending the file to the storage system 108, the disclosure is not limited thereto and the first client 102(1) may send the file to the access management system 106 without departing from the disclosure.

The access management system 106 may generate (1318) an encryption key and a signing key using a secret sharing protocol, as described above. While not illustrated in FIG. 13, the access management system 106 may generate encryption fragments and/or signing fragments using the secret sharing protocol in step 1318. For example, the access management system 106 may generate a single encryption key and a first plurality of signing fragments using the secret sharing protocol. Additionally or alternatively, the access management system 106 may generate the first plurality of signing fragments and a second plurality of encryption fragments using the secret sharing protocol without departing from the disclosure.

The access management system 106 may then generate (1320) a unique identifier for the file and may send (1322) the encryption key, the signing key, and the unique identifier to the storage system 108. The storage system 108 may store (1324) an association between the file, the encryption key, and the signing key, and may store (1326) the unique identifier indicative of the file.

In some examples, the access management system 106 may send the encryption key and the signing key to the storage system 108 in step 1322, while sending the first plurality of signing fragments and/or the second plurality of encryption fragments to clients 102 (not illustrated). Thus, the storage system 108 may only store an association between the file and the encryption key and the signing key in step 1324. However, the disclosure is not limited thereto, and in other examples the access management system 106 may send the encryption key, the signing key, the first plurality of signing fragments, and/or the second plurality of encryption fragments to the storage system 108 in step 1322. For example, the storage system 108 may store the encryption key, the signing key, the first plurality of signing fragments, and/or the second plurality of encryption fragments in step 1324. Thus, the client(s) 102 may retrieve an encryption fragment and/or a signing fragment from the storage system 108 without departing from the disclosure.

Figure 14:
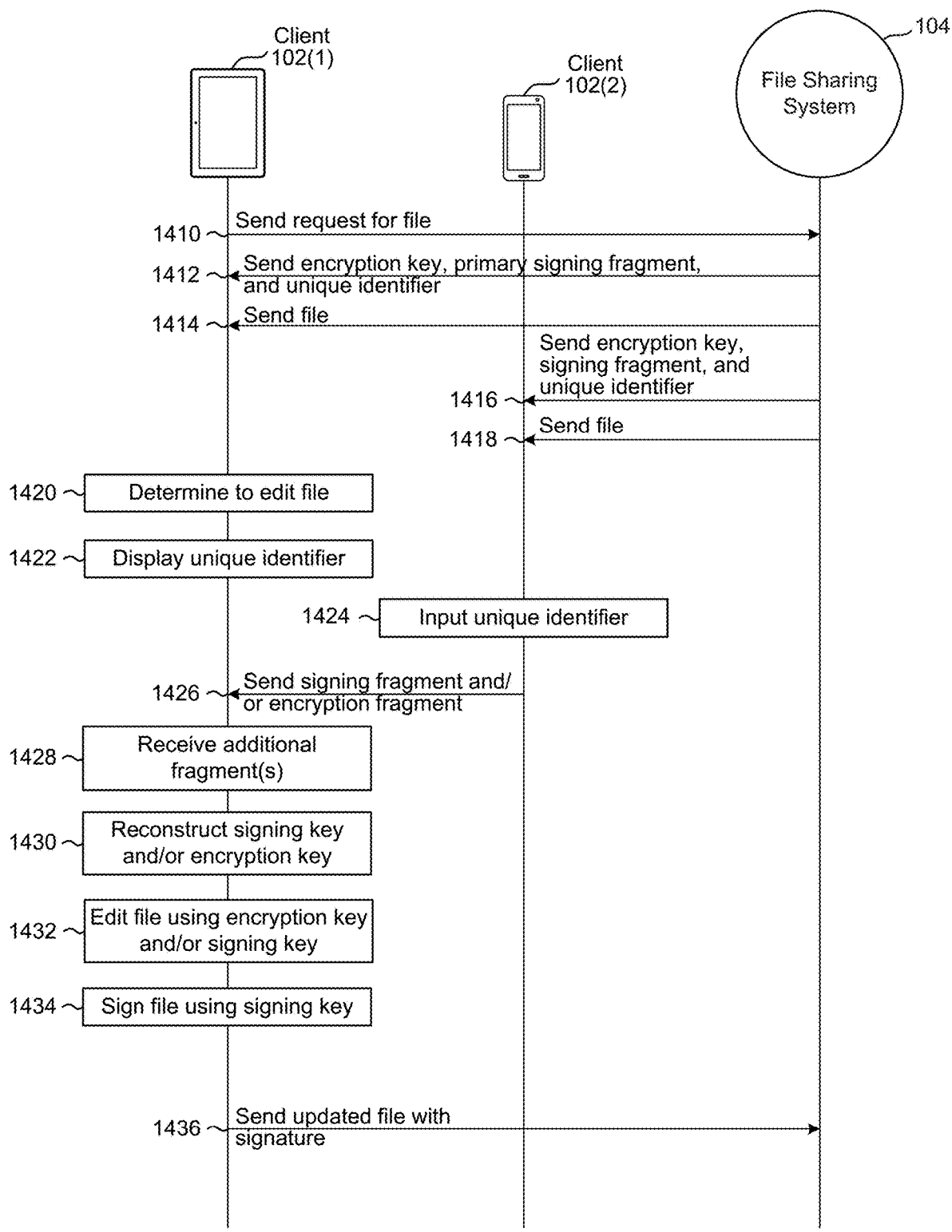
FIG. 14 is a communication diagram illustrating an example method for editing a file using locally stored signing fragments in accordance with some embodiments.

FIG. 14 is a communication diagram illustrating an example method for editing a file using locally stored signing fragments in accordance with some embodiments. As illustrated in FIG. 14, the first client 102(1) may send (1410) a request for a file to the file sharing system 104 and the file sharing system 104 may send (1412) an encryption key, a primary signing fragment, and a unique identifier to the first client 102(1) and may send (1414) the file to the first client 102(1).

For ease of illustration, FIG. 14 illustrates a simplified example in which the file sharing system 104 sends the encryption key, the primary signing fragment, the unique identifier, and the file in steps 1412-1414. However, the disclosure is not limited thereto and steps 1412-1414 may include additional steps not illustrated in FIG. 14. For example, in some examples the first client 102(1) may send the request for the file to the access management system 106 (e.g., step 1410) and the access management system 106 may send the encryption key, the primary signing fragment, and the unique identifier to the first client 102(1) (e.g., step 1412). In addition, the access management system 106 may send a token configured to access the file to the first client 102(1) and the first client 102(1) may send the token along with a request for the first file to the system storage 108. In response to receiving the request and the token, the system storage 108 may send the file to the first client 102(1). Thus, while FIG. 14 illustrates step 1414 as the file sharing system 104 sending the file to the first client 102(1), the disclosure is not limited thereto and step 1414 may correspond to multiple steps not illustrated in FIG. 14 without departing from the disclosure.

In some examples, the first client 102(1) may receive the encryption key and may be able to view the file using the encryption key. However, the disclosure is not limited thereto, and in other examples the first client 102(1) may receive a first primary encryption fragment and may not be able to view the file without receiving additional encryption fragments in order to reconstruct the encryption key.

In addition, the file sharing system 104 may send (1416) the encryption key (or encryption fragment), a signing fragment, and the unique identifier to a second client 102(2) and may send (1418) the file to the second client 102(2). As described above, this may be a simplified illustration and step 1418 may include additional steps not illustrated in FIG. 14. For example, the access management system 106 may send a token configured to access the file to the second client 102(2) and the second client 102(2) may send the token along with a request for the first file to the system storage 108. In response to receiving the request and the token, the system storage 108 may send the file to the second client 102(2) in step 1418. Thus, while FIG. 14 illustrates step 1418 as the file sharing system 104 sending the file to the second client 102(2), the disclosure is not limited thereto and step 1418 may correspond to multiple steps not illustrated in FIG. 14 without departing from the disclosure.

While not illustrated in FIG. 14, the file sharing system 104 may perform steps 1416-1418 for multiple clients 102 without departing from the disclosure. Thus, the clients 102 of primary user(s) and secondary user(s) may receive the file, the encryption key (or encryption fragment), a signing fragment, and the unique identifier from the file sharing system 104 without departing from the disclosure.

The first client 102(1) may determine (1420) to edit the file and may display (1422) the unique identifier of the file on a display of the first client 102(1), and the second client 102(2) may input (1424) the unique identifier. For example, the second client 102(2) may capture image data representing the unique identifier, although the disclosure is not limited thereto and the second client 102(2) may input the unique identifier using any means known to one of skill in the art. In response to receiving the unique identifier, the second client 102(2) may send (1426) the signing fragment and/or encryption fragment stored on the second client 102(2) to the first client 102(1). For example, if the second client 102(2) receives an encryption fragment in step 1414, the second client 102(2) would send the signing fragment and the encryption fragment to the first client 102(1) in step 1422. Otherwise, the second client 102(2) would send the signing fragment to the first client 102(1) in step 1422.

The first client 102(1) may receive (1428) additional fragment(s) from additional client(s) 102 (not illustrated). Once the first client 102(1) has the minimum number of primary signing fragments and the minimum number of secondary signing fragments, the first client 102(1) may reconstruct (1430) the signing key and/or the encryption key using the secret sharing protocol, may edit (1432) the file using the encryption key and/or the signing key, and may sign (1434) the file using the signing key. Later, the first client 102(1) may optionally send (1436) the updated file with the signature to the file sharing system 104. The file sharing system 104 may then perform the steps illustrated in FIG. 12 to update the file in a database.

Figure 15:
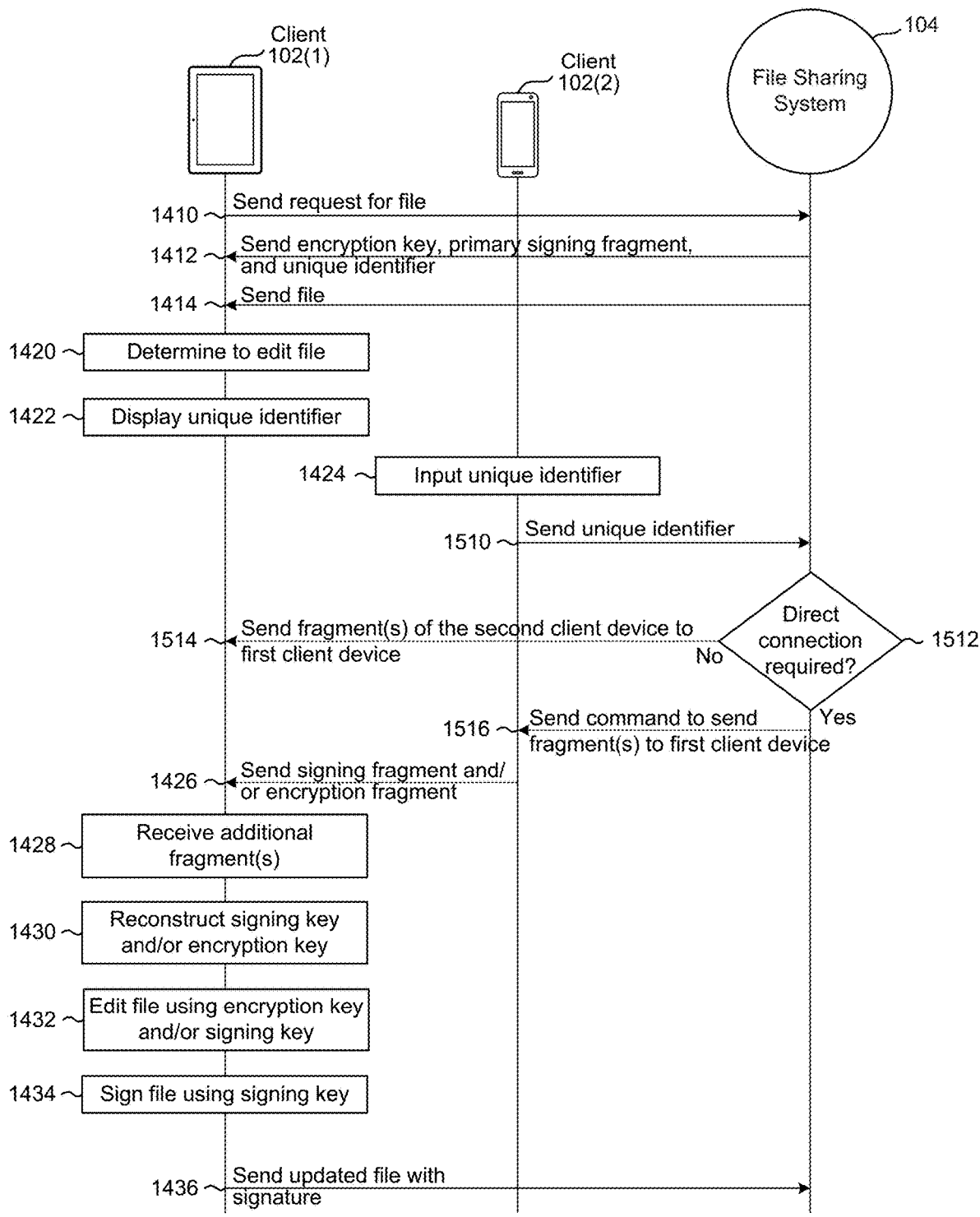
FIG. 15 is a communication diagram illustrating an example method for editing a file using centrally stored signing fragments in accordance with some embodiments.

FIG. 15 is a communication diagram illustrating an example method for editing a file using centrally stored signing fragments in accordance with some embodiments. As illustrated in FIG. 15, the first client 102(1) may send (1410) the request for the file to the file sharing system 104. In response to receiving the request, the file sharing system 104 may send (1412) the encryption key, the primary signing fragment, and the unique identifier to the first client 102(1) and may send (1414) the file to the first client 102(1), as described in greater detail above with regard to FIG. 14. In some examples, the first client 102(1) may receive the encryption key and may be able to view the file using the encryption key. However, the disclosure is not limited thereto, and in other examples the first client 102(1) may receive a first encryption fragment and may not be able to view the file without receiving additional encryption fragments, as described in greater detail above. In the example illustrated in FIG. 15, the file sharing system 104 may not send the file and/or additional information to the second client 102(2) in response to receiving the request from the first client 102(1), although the disclosure is not limited thereto.

The first client 102(1) may determine (1420) to edit the file and may display (1422) the unique identifier of the file on a display of the first client 102(1), and the second client 102(2) may input (1424) the unique identifier. For example, the second client 102(2) may capture image data representing the unique identifier, although the disclosure is not limited thereto and the second client 102(2) may input the unique identifier using any means known to one of skill in the art.

In response to receiving the unique identifier, the second client 102(2) may send (1510) the unique identifier to the file sharing system 104. The file sharing system 104 may determine whether (1512) a direction connection is required, and, if not, may send (1514) fragment(s) of the second client 102(2) to the first client 102(1). For example, the access management system 106 may send the signing fragment and/or the encryption fragment to the first client 102(1). However, if the file sharing system 104 determines that a direct connection is required (e.g., between the first client 102(1) and the second client 102(2)), the file sharing system 104 may send (1516) a command to the second client 102(2) instructing the second client 102(2) to send the fragment(s) to the first client device 102(1) and the second client 102(2) may send (1426) the signing fragment and/or the encryption fragment of the second client 102(2) to the first client 102(1).

In some examples, the file sharing system 104 may send the fragment(s) of the second client 102(2) to the second client 102(2) as part of step 1516. For example, the access management system 106 may determine the signing fragment and/or the encryption fragment of the second client 102(2) and may send the signing fragment and/or the encryption fragment to the second client 102(2) along with the command to send the fragment(s) to the first client 102(1). However, the disclosure is not limited thereto, and in other examples the access management system 106 may have previously sent the fragments(s) of the second client 102(2) to the second client 102(2), as described above with regard to step 1416. For example, the second client 102(2) may have previously received the fragment(s) from the access management system 106 and stored the fragment(s) on the second client 102(2) without departing from the disclosure.

The first client 102(1) may receive (1428) additional fragment(s) from additional client(s) 102 (not illustrated). Once the first client 102(1) has the minimum number of primary signing fragments and the minimum number of secondary signing fragments, the first client 102(1) may reconstruct (1430) the signing key and/or the encryption key using the secret sharing protocol, may edit (1432) the file using the encryption key and/or the signing key, and may sign (1434) the file using the signing key. Later, the first client 102(1) may optionally send (1436) the updated file with the signature to the file sharing system 104. The file sharing system 104 may then perform the steps illustrated in FIG. 12 to update the file in a database.

G. Example Implementations of Methods, Systems, and Computer-Readable Media in Accordance with the Present Disclosure The following paragraphs (M1) through (M13) describe examples of methods that may be implemented in accordance with the present disclosure.

(M1) A method may involve displaying, by a computing device, an identifier indicative of a file, the display of the identifier being readable by a second device, receiving, by the computing device, first data from the second device in response to the identifier being read by the second device, and enabling, by the computing device, performance of at least one action with respect to the file with use of the first data.

(M2) A method may be performed as described in paragraph (M1), wherein receiving the first data may further involve establishing, by the computing device, a secure connection with the second device using a wireless protocol, and receiving, by the computing device using the secure connection, the first data.

(M3) A method may be performed as described in paragraph (M1), wherein receiving the first data may further involve establishing, by the computing device, a secure connection with a computing system, and receiving, by the computing device using the secure connection, the first data.

(M4) A method may be performed as described in any of paragraphs (M1) through (M3), and may further involve modifying the file to generate a second file, and signing the second file by attaching a signature to the second file using the first data.

(M5) A method may be performed as described in any of paragraphs (M1) through (M4), and may further involve, prior to displaying the identifier, receiving, by the computing device from a computing system, a key enabling viewing of the file, and viewing the file using the key.

(M6) A method may be performed as described in any of paragraphs (M1) through (M5), wherein enabling performance of the at least one action may further involve generating, by the computing device using the first data, a first subkey, determining a second subkey for the computing device, and generating, by the computing device, a key to decrypt the file, the key being a combination of the first subkey and the second subkey so that decryption of the file includes use of data from different devices.

(M7) A method may be performed as described in any of paragraphs (M1) through (M6), and may further involve receiving, by the computing device from a third device, second data, and wherein enabling performance of the at least one action may further involve reconstructing a key using at least the first data and the second data.

(M8) A method may be performed as described in any of paragraphs (M1) through (M7), and may further involve receiving, by the computing device from a third device, second data, and wherein enabling performance of the at least one action may further involve reconstructing a first subkey using the first data, reconstructing a second subkey using at least the second data and third data stored on the computing device, and generating a key using the first subkey and the second subkey.

(M9) A method may be performed as described in any of paragraphs (M1) through (M8), and may further involve receiving, by the computing device from a computing system, a first encryption fragment associated with the file, receiving, by the computing device from the second device, a second encryption fragment associated with the file, reconstructing, using at least the first encryption fragment and the second encryption fragment, an encryption key enabling viewing of the file, and viewing the file using the encryption key.

(M10) A method may involve generating, by a computing system, first fragments of data for a plurality of client devices based on a key of a file, the first fragments of data assigned to different client devices and including a first fragment of data assigned to a first client device, generating, by the computing system, an identifier, the identifier configured to initiate a transfer of a second fragment of data from a second client device to the first client device in response to the identifier being displayed on the first client device and read by the second client device, and sending, by the computing system, the file, the identifier, and the first fragment of data to the first client device to enable the first client device to take at least one action with respect to the file in response to receipt of the second fragment of data from the second client device.

(M11) A method may be performed as described in paragraph (M10), wherein generating the first fragments of data may further involve generating the key to enable the first client device to take at least one action with respect to the file, determining a first subkey using the key, determining a first number of primary users required to take the at least one action with respect to the file, determining a second number of total primary users, and generating the second number of the first fragments of data using the first subkey and the first number of primary users, the second number of the first fragments of data including the first fragment of data.

(M12) A method may be performed as described in paragraph (M11), wherein generating the first fragments of data may further involve determining a second subkey using the key, determining a third number of secondary users required to take the at least one action with respect to the file, determining a fourth number of total secondary users, and generating the fourth number of the first fragments of data using the second subkey and the third number of secondary users.

(M13) A method may be performed as described in paragraph (M11) or paragraph (M12), and may further involve receiving, at the computing system from the first client device, data representing the file, the data including a signature, determining the key associated with the file, validating the signature using the key, and storing the data.

The following paragraphs (S1) through (S13) describe examples of systems and devices that may be implemented in accordance with the present disclosure.

(S1) A computing system may include at least one processor, and at least one computer-readable medium encoded with instructions which, when executed by the at least one processor, cause the computing system to display, by a computing device, an identifier indicative of a file, the display of the identifier being readable by a second device, to receive, by the computing device, first data from the second device in response to the identifier being read by the second device, and to enable, by the computing device, performance of at least one action with respect to the file with use of the first data.

(S2) A computing system may be configured as described in paragraph (S1), and the at least one computer-readable medium may be encoded with additional instructions which, when executed by the at least one processor, further cause the computing system to receive the first data at least in part by establishing, by the computing device, a secure connection with the second device using a wireless protocol, and receiving, by the computing device using the secure connection, the first data.

(S3) A computing system may be configured as described in paragraph (S1), and the at least one computer-readable medium may be encoded with additional instructions which, when executed by the at least one processor, further cause the computing system to receive the first data at least in part by establishing, by the computing device, a secure connection with a computing system, and receiving, by the computing device using the secure connection, the first data.

(S4) A computing system may be configured as described in any of paragraphs (S1) through (S3), and the at least one computer-readable medium may be encoded with additional instructions which, when executed by the at least one processor, further cause the computing system to modify the file to generate a second file, and to sign the second file by attaching a signature to the second file using the first data.

(S5) A computing system may be configured as described in any of paragraphs (S1) through (S4), and the at least one computer-readable medium may be encoded with additional instructions which, when executed by the at least one processor, further cause the computing system to, prior to displaying the identifier, receive, by the computing device from a computing system, a key enabling viewing of the file, and view the file using the key.

(S6) A computing system may be configured as described in any of paragraphs (S1) through (S5), and the at least one computer-readable medium may be encoded with additional instructions which, when executed by the at least one processor, further cause the computing system to enable performance of the at least one action at least in part by generating, by the computing device using the first data, a first subkey, determining a second subkey for the computing device, and generating, by the computing device, a key to decrypt the file, the key being a combination of the first subkey and the second subkey so that decryption of the file includes use of data from different devices.

(S7) A computing system may be configured as described in any of paragraphs (S1) through (S6), and the at least one computer-readable medium may be encoded with additional instructions which, when executed by the at least one processor, further cause the computing system to receive, by the computing device from a third device, second data, and to enable performance of the at least one action at least in part by reconstructing a key using at least the first data and the second data.

(S8) A computing system may be configured as described in any of paragraphs (S1) through (S7), and the at least one computer-readable medium may be encoded with additional instructions which, when executed by the at least one processor, further cause the computing system to receive, by the computing device from a third device, second data, and to enable performance of the at least one action at least in part by reconstructing a first subkey using the first data, reconstructing a second subkey using at least the second data and third data stored on the computing device, and generating a key using the first subkey and the second subkey.

(S9) A computing system may be configured as described in any of paragraphs (S1) through (S8), and the at least one computer-readable medium may be encoded with additional instructions which, when executed by the at least one processor, further cause the computing system to receive, by the computing device from a computing system, a first encryption fragment associated with the file, to receive, by the computing device from the second device, a second encryption fragment associated with the file, to reconstruct, using at least the first encryption fragment and the second encryption fragment, an encryption key enabling viewing of the file, and to view the file using the encryption key.

(S10) A computing system may include at least one processor, and at least one computer-readable medium encoded with instructions which, when executed by the at least one processor, cause the computing system to generate first fragments of data for a plurality of client devices based on a key of a file, the first fragments of data assigned to different client devices and including a first fragment of data assigned to a first client device, to generate an identifier, the identifier configured to initiate a transfer of a second fragment of data from a second client device to the first client device in response to the identifier being displayed on the first client device and read by the second client device, and to send the file, the identifier, and the first fragment of data to the first client device to enable the first client device to take at least one action with respect to the file in response to receipt of the second fragment of data from the second client device.

(S11) A computing system may be configured as described in paragraph (S10), and the at least one computer-readable medium may be encoded with additional instructions which, when executed by the at least one processor, further cause the computing system to generate the first fragments of data at least in part by generating the key to enable the first client device to take at least one action with respect to the file, determining a first subkey using the key, determining a first number of primary users required to take the at least one action with respect to the file, determining a second number of total primary users, and generating the second number of the first fragments of data using the first subkey and the first number of primary users, the second number of the first fragments of data including the first fragment of data.

(S12) A computing system may be configured as described in paragraph (S11), and the at least one computer-readable medium may be encoded with additional instructions which, when executed by the at least one processor, further cause the computing system to generate the first fragments of data at least in part by determining a second subkey using the key, determining a third number of secondary users required to take the at least one action with respect to the file, determining a fourth number of total secondary users, and generating the fourth number of the first fragments of data using the second subkey and the third number of secondary users.

(S13) A computing system may be configured as described in paragraph (S11) or paragraph (S12), and the at least one computer-readable medium may be encoded with additional instructions which, when executed by the at least one processor, further cause the computing system to receive, from the first client device, data representing the file, the data including a signature, to determine the key associated with the file, to validate the signature using the key, and to store the data.

The following paragraphs (CRM1) through (CRM13) describe examples of computer-readable media that may be implemented in accordance with the present disclosure.

(CRM1) At least one non-transitory computer-readable medium may be encoded with instructions which, when executed by at least one processor of a computing system, cause the computing system to display, by a computing device, an identifier indicative of a file, the display of the identifier being readable by a second device, to receive, by the computing device, first data from the second device in response to the identifier being read by the second device, and to enable, by the computing device, performance of at least one action with respect to the file with use of the first data.

(CRM2) At least one non-transitory computer-readable medium may be configured as described in paragraph (CRM1), and may be encoded with additional instructions which, when executed by the at least one processor, further cause the computing system to receive the first data at least in part by establishing, by the computing device, a secure connection with the second device using a wireless protocol, and receiving, by the computing device using the secure connection, the first data.

(CRM3) At least one non-transitory computer-readable medium may be configured as described in paragraph (CRM1), and may be encoded with additional instructions which, when executed by the at least one processor, further cause the computing system to receive the first data at least in part by establishing, by the computing device, a secure connection with a computing system, and receiving, by the computing device using the secure connection, the first data.

(CRM4) At least one non-transitory computer-readable medium may be configured as described in any of paragraphs (CRM1) through (CRM3), and may be encoded with additional instructions which, when executed by the at least one processor, further cause the computing system to modify the file to generate a second file, and to sign the second file by attaching a signature to the second file using the first data.

(CRM5) At least one non-transitory computer-readable medium may be configured as described in any of paragraphs (CRM1) through (CRM4), and may be encoded with additional instructions which, when executed by the at least one processor, further cause the computing system to, prior to displaying the identifier, receive, by the computing device from a computing system, a key enabling viewing of the file, and view the file using the key.

(CRM6) At least one non-transitory computer-readable medium may be configured as described in any of paragraphs (CRM1) through (CRM5), and the at least one computer-readable medium may be encoded with additional instructions which, when executed by the at least one processor, further cause the computing system to enable performance of the at least one action at least in part by generating, by the computing device using the first data, a first subkey, determining a second subkey for the computing device, and generating, by the computing device, a key to decrypt the file, the key being a combination of the first subkey and the second subkey so that decryption of the file includes use of data from different devices.

(CRM7) At least one non-transitory computer-readable medium may be configured as described in any of paragraphs (CRM1) through (CRM6), and the at least one computer-readable medium may be encoded with additional instructions which, when executed by the at least one processor, further cause the computing system to receive, by the computing device from a third device, second data, and to enable performance of the at least one action at least in part by reconstructing a key using at least the first data and the second data.

(CRM8) At least one non-transitory computer-readable medium may be configured as described in any of paragraphs (CRM1) through (CRM7), and may be encoded with additional instructions which, when executed by the at least one processor, further cause the computing system to receive, by the computing device from a third device, second data, and to enable performance of the at least one action at least in part by reconstructing a first subkey using the first data, reconstructing a second subkey using at least the second data and third data stored on the computing device, and generating a key using the first subkey and the second subkey.

(CRM9) At least one non-transitory computer-readable medium may be configured as described in any of paragraphs (CRM1) through (CRM8), and may be encoded with additional instructions which, when executed by the at least one processor, further cause the computing system to receive, by the computing device from a computing system, a first encryption fragment associated with the file, to receive, by the computing device from the second device, a second encryption fragment associated with the file, to reconstruct, using at least the first encryption fragment and the second encryption fragment, an encryption key enabling viewing of the file, and to view the file using the encryption key.

(CRM10) At least one non-transitory computer-readable medium may be encoded with instructions which, when executed by at least one processor of a computing system, cause the computing system to generate first fragments of data for a plurality of client devices based on a key of a file, the first fragments of data assigned to different client devices and including a first fragment of data assigned to a first client device, to generate an identifier, the identifier configured to initiate a transfer of a second fragment of data from a second client device to the first client device in response to the identifier being displayed on the first client device and read by the second client device, and to send the file, the identifier, and the first fragment of data to the first client device to enable the first client device to take at least one action with respect to the file in response to receipt of the second fragment of data from the second client device.

(CRM11) At least one non-transitory computer-readable medium may be configured as described in paragraph (CRM10), and may be encoded with additional instructions which, when executed by the at least one processor, further cause the computing system to generate the first fragments of data at least in part by generating the key to enable the first client device to take at least one action with respect to the file, determining a first subkey using the key, determining a first number of primary users required to take the at least one action with respect to the file, determining a second number of total primary users, and generating the second number of the first fragments of data using the first subkey and the first number of primary users, the second number of the first fragments of data including the first fragment of data.

(CRM12) At least one non-transitory computer-readable medium may be configured as described in paragraph (CRM11), and may be encoded with additional instructions which, when executed by the at least one processor, further cause the computing system to generate the first fragments of data at least in part by determining a second subkey using the key, determining a third number of secondary users required to take the at least one action with respect to the file, determining a fourth number of total secondary users, and generating the fourth number of the first fragments of data using the second subkey and the third number of secondary users.

(CRM13) At least one non-transitory computer-readable medium may be configured as described in paragraph (CRM11) or paragraph (CRM12), and may be encoded with additional instructions which, when executed by the at least one processor, further cause the computing system to receive, from the first client device, data representing the file, the data including a signature, to determine the key associated with the file, to validate the signature using the key, and to store the data.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   generating, by a computing system, a first key for a file;
   determining, by the computing system, a first number of primary users required to take at least one action with respect to the file using the first key;
   determining, by the computing system, a second number of total primary users;
   generating, by the computing system and using the first key and the first number of primary users, a third number of first fragments of data equal to the second number of total primary users, wherein the third number of the first fragments of data are generated such that a first set of the third number of the first fragments of data can be used to reconstruct the first key, the third number of the first fragments of data including a first data fragment and a second data fragment;
   sending, by the computing system, the file and an identifier to a first client device to configure the first client device to display the identifier on the first client device in response to a request received by the first client device to take at least one action with respect to the file;
   sending, by the computing system, the second data fragment and the identifier to a second client device to configure the second client device to send the second data fragment to the first client device in response to receipt by the second client device of the identifier displayed by the first client device; and
   sending, by the computing system, the first data fragment to the first client device to configure the first client device to reconstruct the first key in response to receipt of the second data fragment from the second client device.

2. The method of claim 1, further comprising:
   receiving, at the computing system from the first client device, data representing the file, the data including a signature;
   determining the first key associated with the file;
   validating the signature using the first key; and
   storing the data.

3. The method of claim 1, further comprising:
   generating, by the computing system, a key; and
   determining, by the computing system, a first subkey using the key, wherein the first key comprises the first subkey.

4. The method of claim 3, further comprising:
   determining, by the computing system, a second subkey using the key;
   determining, by the computing system, a fourth number of secondary users required to take the at least one action with respect to the file using the second subkey;
   determining, by the computing system, a fifth number of total secondary users;
   generating, by the computing system and using the second subkey and the fourth number of secondary users, a sixth number of second fragments of data equal to the fifth number of total secondary users, wherein the sixth number of the second fragments of data are generated such that a second set of the sixth number of the second fragments of data can be used to reconstruct the second subkey, the sixth number of second fragments including a third data fragment; and
   sending, by the computing system, the third data fragment and the identifier to a third client device to configure the third client device to send the third data fragment to the first client device in response to receipt by the third client device of the identifier displayed by the first client device.

5. The method of claim 4, wherein, the sixth number of the second fragments of data further include at least a fourth data fragment, and the method further comprises:
   sending, by the computing system, the fourth data fragment and the identifier to a fourth client device to configure the fourth client device to send the fourth data fragment to the first client device in response to receipt by the fourth client device of the identifier displayed by the first client device.

6. The method of claim 1, wherein the third number of the first fragments of data further include at least a third data fragment, and the method further comprises:
   sending, by the computing system, the third data fragment and the identifier to a third client device to configure the third client device to send the third data fragment to the first client device in response to receipt by the third client device of the identifier displayed by the first client device.

7. A system, comprising:
   at least one processor; and
   at least one computer-readable medium encoded with instruction which, when executed by the at least one processor, cause the system to:

generate a first key for a file;

determine a first number of primary users required to take at least one action with respect to the file using the first key;

determine a second number of total primary users;

generate, using the first key and the first number of primary users, a third number of first fragments of data equal to the second number of total primary users, wherein the third number of the first fragments of data are generated such that a first set of the third number of the first fragments of data can be used to reconstruct the first key, the third number of the first fragments of data including a first data fragment and a second data fragment;

send the file and an identifier to a first client device to configure the first client device to display the identifier on the first client device in response to a request received by the first client device to take at least one action with respect to the file;

send the second data fragment and the identifier to a second client device to configure the second client device to send the second data fragment to the first client device in response to receipt by the second client device of the identifier displayed by the first client device; and send the first data fragment to the first client device to configure the first client device to reconstruct the first key in response to receipt of the second data fragment from the second client device.

8. The system of claim 7, wherein the at least one computer-readable medium is further encoded with additional instructions which, when executed by the at least one processor, further cause the system to:

receive, from the first client device, data representing the file, the data including a signature;

determine the first key associated with the file;

validate the signature using the first key; and store the data.

9. The system of claim 7, wherein the third number of the first fragments of data further include at least a third data fragment, and the at least one computer-readable medium is further encoded with additional instructions which, when executed by the at least one processor, further cause the system to:

send the third data fragment and the identifier to a third client device to configure the third client device to send the third data fragment to the first client device in response to receipt by the third client device of the identifier displayed by the first client device.

10. The system of claim 7, wherein the at least one computer-readable medium is further encoded with additional instructions which, when executed by the at least one processor, further cause the system to:

generate a key; and determine a first subkey using the key, wherein the first key comprises the first subkey.

11. The system of claim 10, wherein the at least one computer-readable medium is further encoded with additional instructions which, when executed by the at least one processor, further cause the system to:

determine a second subkey using the key;

determine a fourth number of secondary users required to take the at least one action with respect to the file using the second subkey;

determine a fifth number of total secondary users;

generate, using the second subkey and the fourth number of secondary users, a sixth number of second fragments of data equal to the fifth number of total secondary users, wherein the sixth number of the second fragments of data are generated such that a second set of the sixth number of the second fragments of data can be used to reconstruct the second subkey, the sixth number of second fragments including a third data fragment; and send the third data fragment and the identifier to a third client device to configure the third client device to send the third data fragment to the first client device in response to receipt by the third client device of the identifier displayed by the first client device.

12. The system of claim 11, wherein, the sixth number of the second fragments of data further include at least a fourth data fragment, and the at least one computer-readable medium is further encoded with additional instructions which, when executed by the at least one processor, further cause the system to:

send the fourth data fragment and the identifier to a fourth client device to configure the fourth client device to send the fourth data fragment to the first client device in response to receipt by the fourth client device of the identifier displayed by the first client device.

13. At least one non-transitory computer-readable medium encoded with instruction which, when executed by at least one processor of a system, cause the system to:

generate a first key for a file;

determine a first number of primary users required to take at least one action with respect to the file using the first key;

determine a second number of total primary users;

generate, using the first key and the first number of primary users, a third number of first fragments of data equal to the second number of total primary users, wherein the third number of the first fragments of data are generated such that a first set of the third number of the first fragments of data can be used to reconstruct the first key, the third number of the first fragments of data including a first data fragment and a second data fragment;

send the file and an identifier to a first client device to configure the first client device to display the identifier on the first client device in response to a request received by the first client device to take at least one action with respect to the file;

send the second data fragment and the identifier to a second client device to configure the second client device to send the second data fragment to the first client device in response to receipt by the second client device of the identifier displayed by the first client device; and send the first data fragment to the first client device to configure the first client device to reconstruct the first key in response to receipt of the second data fragment from the second client device.

14. The at least one non-transitory computer-readable medium of claim 13, further encoded with additional instructions which, when executed by the at least one processor, further cause the system to:

receive, from the first client device, data representing the file, the data including a signature;

determine the first key associated with the file;

validate the signature using the first key; and store the data.

15. The at least one non-transitory computer-readable medium of claim 13, wherein the third number of the first fragments of data further include at least a third data fragment, and the at least one computer-readable medium is further encoded with additional instructions which, when executed by the at least one processor, further cause the system to:

send the third data fragment and the identifier to a third client device to configure the third client device to send the third data fragment to the first client device in response to receipt by the third client device of the identifier displayed by the first client device.

16. The at least one non-transitory computer-readable medium of claim 13, further encoded with additional instructions which, when executed by the at least one processor, further cause the system to:

generate a key; and determine a first subkey using the key, wherein the first key comprises the first subkey.

17. The at least one non-transitory computer-readable medium of claim 16, further encoded with additional instructions which, when executed by the at least one processor, further cause the system to:

determine a second subkey using the key;

determine a fourth number of secondary users required to take the at least one action with respect to the file using the second subkey;

determine a fifth number of total secondary users;

generate, using the second subkey and the fourth number of secondary users, a sixth number of second fragments of data equal to the fifth number of total secondary users, wherein the sixth number of the second fragments of data are generated such that a second set of the sixth number of the second fragments of data can be used to reconstruct the second subkey, the sixth number of second fragments including a third data fragment; and send the third data fragment and the identifier to a third client device to configure the third client device to send the third data fragment to the first client device in response to receipt by the third client device of the identifier displayed by the first client device.

18. The at least one non-transitory computer-readable medium of claim 17, wherein, the sixth number of the second fragments of data further include at least a fourth data fragment, and the at least one computer-readable medium is further encoded with additional instructions which, when executed by the at least one processor, further cause the system to:

send the fourth data fragment and the identifier to a fourth client device to configure the fourth client device to send the fourth data fragment to the first client device in response to receipt by the fourth client device of the identifier displayed by the first client device.

* * * * *